(12) United States Patent
McCain et al.

(10) Patent No.: US 9,161,511 B2
(45) Date of Patent: Oct. 20, 2015

(54) AUTOMATED ROTARY MILKING SYSTEM

(75) Inventors: James F. McCain, Katy, TX (US); Gary C. Steingraber, Madison, WI (US); David A. Reid, Hazel Green, WI (US); Dennis E. Dynneson, Waunakee, WI (US)

(73) Assignee: Technologies Holdings Corp., Houston, TX (US)

( * ) Notice: Subject to any disclaimer, the term of this patent is extended or adjusted under 35 U.S.C. 154(b) by 641 days.

(21) Appl. No.: 12/830,937

(22) Filed: Jul. 6, 2010

(65) Prior Publication Data

US 2012/0006269 A1    Jan. 12, 2012

(51) Int. Cl.
| | |
|---|---|
| A01J 5/00 | (2006.01) |
| A01J 5/007 | (2006.01) |
| A01J 5/017 | (2006.01) |
| A01J 7/04 | (2006.01) |
| A01K 1/12 | (2006.01) |

(52) U.S. Cl.
CPC ............... *A01J 5/007* (2013.01); *A01J 5/0175* (2013.01); *A01J 7/04* (2013.01); *A01K 1/126* (2013.01)

(58) Field of Classification Search
CPC ........... A01J 5/007; A01J 5/0175; A01J 7/04; A01K 1/126
USPC ........ 119/14.01–14.04, 14.18, 516, 520–521, 119/523–524, 840–842
See application file for complete search history.

(56) References Cited

U.S. PATENT DOCUMENTS

| | | | |
|---|---|---|---|
| 2,731,300 A | 1/1956 | Jansen | 299/111 |
| 2,830,559 A | 4/1958 | McMurray | 119/159 |
| 3,174,457 A | 3/1965 | Lyttle et al. | 119/1 |
| 3,835,814 A * | 9/1974 | Jacobs et al. | 119/14.04 |
| 4,306,454 A | 12/1981 | Olrik et al. | 73/224 |
| 4,508,058 A | 4/1985 | Jakobson et al. | 119/14.02 |
| 4,617,876 A * | 10/1986 | Hayes | 119/842 |

(Continued)

FOREIGN PATENT DOCUMENTS

| | | | | |
|---|---|---|---|---|
| AT | 386 922 B | 11/1988 | | A01J 7/00 |
| AT | 387 686 B | 2/1989 | | A01J 5/01 |

(Continued)

OTHER PUBLICATIONS

New Zealand Intellectual Property Office, First Examination Report, IP No. 705897; 3 pages, May 29, 2015.

(Continued)

*Primary Examiner* — Rob Swiatek
*Assistant Examiner* — Ebony Evans
(74) *Attorney, Agent, or Firm* — Baker Botts L.L.P.

(57) ABSTRACT

A milking system includes a rotary milking platform having a plurality of milking stalls and a plurality of milking devices, each milking device configured for attachment to the teats of a dairy livestock located in a corresponding milking stall of the rotary milking platform. The system further includes one or more robotic devices operable to perform one or more functions, including preparing the teats of a dairy livestock for the attachment of a milking apparatus, attaching a milking apparatus to the teats of a dairy livestock, and applying a sanitizing agent to the teats of a dairy livestock subsequent to the removal of a milking apparatus from the teats of the dairy livestock. Each of the one or more functions performed by the one or more robotic devices is performed during a period of time when the rotary milking platform is substantially stationary.

8 Claims, 7 Drawing Sheets

(56) References Cited

U.S. PATENT DOCUMENTS

| | | | |
|---|---|---|---|
| 4,726,322 A | 2/1988 | Torsius | 119/14.14 |
| 4,735,172 A | 4/1988 | Wahlström et al. | 119/14.1 |
| 4,819,875 A | 4/1989 | Beal | 239/97 |
| 4,867,103 A | 9/1989 | Montalescot et al. | 119/14.08 |
| 4,941,433 A | 7/1990 | Hanauer | 119/14.02 |
| 5,020,477 A | 6/1991 | Dessing et al. | 119/14.08 |
| 5,069,160 A | 12/1991 | Street et al. | 119/14.08 |
| 5,088,447 A * | 2/1992 | Spencer et al. | 119/51.02 |
| 5,285,746 A | 2/1994 | Moreau | 119/14.03 |
| 5,379,721 A | 1/1995 | Dessing et al. | 119/14.08 |
| 5,479,876 A | 1/1996 | Street et al. | 119/14.08 |
| 5,553,569 A | 9/1996 | Street et al. | 119/525 |
| 5,596,945 A | 1/1997 | van der Lely | 119/14.03 |
| 5,666,903 A | 9/1997 | Bull et al. | 119/14.01 |
| 5,678,506 A | 10/1997 | van der Berg et al. | 119/14.18 |
| 5,718,185 A | 2/1998 | Pichler et al. | 119/14.04 |
| 5,722,343 A | 3/1998 | Aurik et al. | 119/14.02 |
| 5,771,837 A * | 6/1998 | van der Lely | 119/14.02 |
| 5,784,994 A | 7/1998 | van der Lely | 119/14.08 |
| 5,816,190 A | 10/1998 | van der Lely | 119/14.08 |
| 5,862,776 A | 1/1999 | van den Berg | 119/14.1 |
| 5,918,566 A | 7/1999 | van den Berg | 119/14.02 |
| 5,934,220 A | 8/1999 | Hall et al. | 119/14.08 |
| 5,979,359 A | 11/1999 | Hansson | 119/14.08 |
| 6,050,219 A | 4/2000 | van der Lely | 119/14.08 |
| 6,055,930 A | 5/2000 | Stein et al. | 119/14.08 |
| 6,105,536 A * | 8/2000 | DeWaard | 119/14.04 |
| 6,118,118 A | 9/2000 | van der Lely et al. | 250/221 |
| 6,167,839 B1 | 1/2001 | Isaksson et al. | 119/14.08 |
| 6,189,486 B1 | 2/2001 | Lindholm | 119/14.02 |
| 6,205,949 B1 | 3/2001 | van den Berg | 119/14.02 |
| 6,213,051 B1 | 4/2001 | Fransen | 119/14.08 |
| 6,227,142 B1 | 5/2001 | Birk | 119/14.08 |
| 6,234,109 B1 | 5/2001 | Andersson et al. | 119/14.08 |
| 6,237,530 B1 | 5/2001 | van der Lely et al. | |
| 6,257,169 B1 | 7/2001 | Oosterling | 119/14.02 |
| 6,321,682 B1 | 11/2001 | Eriksson et al. | 119/14.44 |
| 6,323,942 B1 | 11/2001 | Bamji | 356/5.01 |
| 6,341,575 B1 | 1/2002 | Forsén | 119/14.08 |
| 6,363,883 B1 | 4/2002 | Birk | 119/14.08 |
| 6,401,654 B1 | 6/2002 | Hallsten et al. | 119/14.18 |
| 6,443,094 B1 | 9/2002 | DeWaard | 119/14.18 |
| 6,532,892 B1 | 3/2003 | Nilsson | 119/14.03 |
| 6,543,381 B1 | 4/2003 | Birk et al. | 119/14.08 |
| 6,553,942 B1 | 4/2003 | Eriksson | 119/670 |
| 6,568,352 B2 | 5/2003 | Fransen | 119/668 |
| 6,591,784 B1 | 7/2003 | Eriksson | 119/670 |
| 6,626,130 B1 | 9/2003 | Eriksson | 119/670 |
| 6,729,262 B2 | 5/2004 | Ealy et al. | 119/14.08 |
| 6,864,914 B1 | 3/2005 | Birk | 348/211.99 |
| 6,974,373 B2 | 12/2005 | Kriesel | 452/157 |
| 6,976,644 B2 | 12/2005 | Troudt | 239/587.1 |
| 7,039,220 B2 * | 5/2006 | Kriesel | 382/110 |
| 7,073,458 B2 * | 7/2006 | Sjolund et al. | 119/14.02 |
| 7,128,020 B2 | 10/2006 | Björk et al. | 119/14.18 |
| 7,146,928 B2 | 12/2006 | Ealy et al. | 119/14.08 |
| 7,246,571 B2 | 7/2007 | Van Den Berg et al. | 119/14.08 |
| 7,299,766 B2 | 11/2007 | Van Den Berg et al. | 119/14.02 |
| 7,377,232 B2 | 5/2008 | Holmgren et al. | 119/670 |
| 7,690,327 B2 | 4/2010 | Van Den Berg | 119/14.02 |
| 7,882,802 B2 | 2/2011 | Van Den Berg et al. | 119/14.08 |
| 8,036,429 B2 * | 10/2011 | Doyle, II | 382/110 |
| 8,074,600 B2 * | 12/2011 | Kallen et al. | 119/14.04 |
| 8,210,122 B2 | 7/2012 | Pettersson et al. | 119/14.08 |
| 2001/0024514 A1 | 9/2001 | Matsunaga | 382/106 |
| 2002/0108576 A1 | 8/2002 | Lely et al. | 119/14.02 |
| 2003/0097990 A1 | 5/2003 | Bjork et al. | 119/14.08 |
| 2004/0103846 A1 | 6/2004 | Fransen | 119/14.03 |
| 2005/0223997 A1 * | 10/2005 | Umegard | 119/14.08 |
| 2006/0196431 A1 | 9/2006 | Kaever et al. | 119/14.04 |
| 2007/0137579 A1 | 6/2007 | Osthues et al. | 119/14.03 |
| 2007/0245964 A1 | 10/2007 | Van Den Berg et al. | 119/14.08 |
| 2007/0277737 A1 | 12/2007 | Maier et al. | 119/14.45 |
| 2008/0202432 A1 | 8/2008 | Petterson | 119/14.03 |
| 2010/0031889 A1 | 2/2010 | Eriksson et al. | 119/14.02 |
| 2010/0095893 A1 | 4/2010 | Kallen et al. | 119/14.04 |
| 2010/0116211 A1 * | 5/2010 | Sundborger | 119/14.02 |
| 2010/0186675 A1 | 7/2010 | Van Den Berg | 119/14.03 |
| 2010/0282172 A1 * | 11/2010 | Eriksson et al. | 119/14.02 |
| 2010/0289649 A1 | 11/2010 | Holmgren et al. | 340/573.3 |
| 2011/0114024 A1 | 5/2011 | Van Den Berg | 119/14.02 |
| 2011/0239945 A1 | 10/2011 | Van Den Berg | 119/14.02 |
| 2012/0000427 A1 | 1/2012 | Nilsson | 119/14.02 |
| 2012/0048207 A1 | 3/2012 | Hofman et al. | 119/651 |
| 2012/0048208 A1 | 3/2012 | Hofman et al. | 119/651 |
| 2012/0180729 A1 | 7/2012 | Van Dorp | 119/14.08 |
| 2013/0055955 A1 * | 3/2013 | Nyberg | 119/14.08 |

FOREIGN PATENT DOCUMENTS

| | | | |
|---|---|---|---|
| AT | 404 537 B | 12/1998 | A01J 7/04 |
| AT | 406 108 B | 2/2000 | A01J 5/00 |
| AU | 2005222545 A1 | 11/2005 | A01J 5/017 |
| CA | 1 253 956 | 5/1989 | A01J 7/00 |
| CA | 2 313 533 A1 | 6/1999 | G06T 1/00 |
| CA | 2 315 018 A1 | 7/1999 | G06T 1/00 |
| DE | 37 42 867 A1 | 7/1989 | A01J 5/017 |
| DE | 39 38 077 A1 | 5/1991 | A01J 5/017 |
| DE | 689 19 414 T3 | 5/1995 | A01J 5/017 |
| DE | 691 16 926 T2 | 11/1996 | A01J 5/017 |
| DE | 196 36 551 A1 | 3/1998 | A01J 5/017 |
| DE | 689 28 489 T2 | 4/1998 | A01J 5/00 |
| DE | 38 75 414 T3 | 8/1999 | A01J 5/00 |
| DE | 691 32 321 T2 | 2/2001 | A01J 5/017 |
| DE | 102 12 676 C1 | 3/2002 | A01K 1/12 |
| DK | 144542 B | 5/1980 | A01J 7/00 |
| DK | 147721 B | 7/1981 | A01J 5/04 |
| DK | 218482 A | 11/1983 | A01J 5/10 |
| DK | 328482 A | 1/1984 | A01J 7/00 |
| DK | 169247 B1 | 9/1994 | A01J 5/00 |
| DK | 173139 B1 | 6/1998 | A01J 5/04 |
| EP | 0 188 303 A1 | 7/1986 | A01J 7/00 |
| EP | 0 209 202 A1 | 1/1987 | A01J 7/00 |
| EP | 0 229 682 A1 | 7/1987 | A01J 7/00 |
| EP | 0 232 568 A1 | 8/1987 | G01S 15/88 |
| EP | 0 119 222 B1 | 4/1988 | A01J 5/04 |
| EP | 0 300 582 A1 | 1/1989 | A01J 7/00 |
| EP | 0 306 579 A1 | 3/1989 | A01J 5/017 |
| EP | 0 309 036 A1 | 3/1989 | A01J 7/00 |
| EP | 0 327 037 A2 | 8/1989 | A01M 7/00 |
| EP | 0 329 248 A1 | 8/1989 | A01J 7/00 |
| EP | 0 349 019 A2 | 1/1990 | A01J 5/08 |
| EP | 0 360 354 A1 | 3/1990 | A01J 7/00 |
| EP | 0 432 148 A2 | 6/1991 | A01K 1/12 |
| EP | 0 440 313 A2 | 8/1991 | G01S 15/42 |
| EP | 0 448 132 A2 | 9/1991 | A01J 7/00 |
| EP | 0 455 305 A1 | 11/1991 | G01S 7/48 |
| EP | 0 467 489 A1 | 1/1992 | A01J 7/00 |
| EP | 0 472 247 A2 | 2/1992 | A01J 7/00 |
| EP | 0 479 397 A2 | 4/1992 | A01J 7/00 |
| EP | 0 511 722 A2 | 11/1992 | A01D 7/00 |
| EP | 0 511 723 A2 | 11/1992 | A01D 7/00 |
| EP | 0 516 246 A2 | 12/1992 | A01D 7/00 |
| EP | 0 541 517 A2 | 5/1993 | A01J 7/00 |
| EP | 0 545 916 A2 | 6/1993 | A01J 7/00 |
| EP | 0 548 058 A2 | 6/1993 | A01K 1/12 |
| EP | 0 553 940 A2 | 8/1993 | A01J 7/00 |
| EP | 0 565 189 A2 | 10/1993 | A01J 7/00 |
| EP | 0 574 089 A2 | 12/1993 | G01S 7/48 |
| EP | 0 630 558 A2 | 12/1994 | A01K 1/12 |
| EP | 0 634 097 A1 | 1/1995 | A01K 1/12 |
| EP | 0 643 907 A2 | 3/1995 | A01J 7/00 |
| EP | 0 688 498 A2 | 12/1995 | A01J 7/00 |
| EP | 0 689 762 A1 | 1/1996 | A01K 1/12 |
| EP | 0 779 025 A2 | 6/1997 | A01J 5/017 |
| EP | 0 789 995 A1 | 8/1997 | A01J 7/04 |
| EP | 0 824 857 A1 | 2/1998 | A01J 5/017 |
| EP | 0 880 889 A2 | 12/1998 | A01J 5/017 |
| EP | 0 900 522 A1 | 3/1999 | A01J 5/017 |
| EP | 0 951 651 B1 | 10/1999 | G01S 17/00 |
| EP | 1 089 614 B1 | 4/2001 | A01J 7/02 |
| EP | 1 211 928 B1 | 6/2002 | A01J 5/017 |
| EP | 1 253 440 A1 | 10/2002 | G01S 7/481 |
| EP | 1 316 253 A2 | 11/2002 | A01K 1/12 |

(56) References Cited

FOREIGN PATENT DOCUMENTS

| | | | | |
|---|---|---|---|---|
| EP | 1 279 327 A2 | 1/2003 | ............... | A01J 5/017 |
| EP | 1 388 281 A1 | 2/2004 | ............... | A01J 7/02 |
| EP | 1 447 002 A1 | 8/2004 | ............... | A01J 5/017 |
| EP | 1 460 453 A1 | 9/2004 | ............... | G01S 17/89 |
| EP | 1 520 468 A1 | 4/2005 | ............... | A01J 7/04 |
| EP | 1 537 774 A1 | 6/2005 | ............... | A01J 5/017 |
| EP | 1 537 775 A1 | 6/2005 | ............... | A01J 5/017 |
| EP | 1 523 882 A2 | 3/2009 | ............... | A01K 1/12 |
| ES | 2 064 892 T3 | 2/1995 | ............... | A01J 5/017 |
| FI | 88099 B | 12/1992 | ............... | A01J 7/00 |
| FI | 20002169 A | 4/2002 | ............... | A01J 5/01 |
| FR | 2 595 197 A1 | 9/1987 | ............... | A01J 5/017 |
| GB | 2 184 233 A | 6/1987 | ............... | G01N 21/89 |
| GB | 2 218 888 A | 11/1989 | ............... | A01J 7/00 |
| JP | 62-159078 A | 7/1987 | ............... | A01J 5/00 |
| JP | 9-196631 A | 7/1997 | ............... | G01B 11/00 |
| JP | 9-243315 A | 9/1997 | ............... | A01J 5/00 |
| JP | 9-275834 A | 10/1997 | ............... | A01J 5/00 |
| JP | 9-285234 A | 11/1997 | ............... | A01J 5/00 |
| JP | 11-276002 A | 10/1999 | ............... | A01J 5/00 |
| JP | 11-281340 A | 10/1999 | ............... | A01J 5/00 |
| JP | 2001-504944 A | 4/2001 | ............... | A01J 5/00 |
| JP | 2002-521007 A | 7/2002 | ............... | A01J 5/00 |
| JP | 2002-253075 A | 9/2002 | ............... | A01J 5/00 |
| NL | 8502039 A | 2/1987 | ............... | A01J 5/017 |
| NL | 8503580 A | 7/1987 | ............... | A01J 5/00 |
| NL | 8600076 A | 8/1987 | ............... | A01J 5/00 |
| NL | 8602699 A | 5/1988 | ............... | A01J 5/017 |
| NL | 8800042 A | 8/1989 | ............... | A01J 5/017 |
| NL | 8801785 A | 2/1990 | ............... | A01J 5/017 |
| NL | 9101088 A | 1/1993 | ............... | A01J 7/00 |
| NL | 9201434 A | 3/1994 | ............... | A01J 5/017 |
| NL | 9201902 A | 6/1994 | ............... | A01J 5/017 |
| NL | 9400220 A | 9/1995 | ............... | A01J 5/017 |
| NL | 9400471 A | 11/1995 | ............... | A01J 5/017 |
| NL | 9500276 A | 9/1996 | ............... | A01J 5/017 |
| NL | 9500277 A | 9/1996 | ............... | A01J 5/017 |
| NL | 9500363 A | 10/1996 | ............... | A01J 5/017 |
| NL | 9500566 A | 11/1996 | ............... | A01J 5/01 |
| NL | 1 009 632 C2 | 7/1998 | ............... | A01J 5/017 |
| NL | 1006804 C2 | 2/1999 | ............... | A01J 5/00 |
| NL | 1009711 C2 | 1/2000 | ............... | A01J 5/00 |
| NL | 1013026 C2 | 3/2001 | ............... | A01J 5/017 |
| NL | 1018563 C1 | 1/2003 | ............... | A01J 5/017 |
| SE | 419 901 B | 8/1981 | ............... | A01J 7/00 |
| SE | 425 821 B | 11/1982 | ............... | A01J 7/00 |
| SE | 433 553 B | 6/1984 | ............... | A01J 5/10 |
| SE | 512 334 C2 | 2/2000 | ............... | A01J 5/017 |
| WO | WO 96/20587 A1 | 7/1996 | ............... | A01J 5/017 |
| WO | WO 97/15183 A1 | 5/1997 | ............... | A01J 5/017 |
| WO | WO 97/15901 A1 | 5/1997 | ............... | G06T 7/00 |
| WO | WO 97/37528 A1 | 10/1997 | ............... | A01J 5/017 |
| WO | WO 98/01022 A1 | 1/1998 | ............... | A01J 5/017 |
| WO | WO 98/35547 A1 | 8/1998 | ............... | A01J 5/017 |
| WO | WO 98/44782 A1 | 10/1998 | ............... | A01J 5/017 |
| WO | WO 98/45808 A1 | 10/1998 | ............... | G06T 1/00 |
| WO | WO 98/47348 A1 | 10/1998 | ............... | A01J 5/017 |
| WO | WO 99/09430 A2 | 2/1999 | ............... | G01S 17/00 |
| WO | WO 99/30277 A1 | 6/1999 | ............... | G06T 1/00 |
| WO | WO 99/33020 A1 | 7/1999 | ............... | G06T 1/00 |
| WO | WO 00/04763 A1 | 2/2000 | ............... | A01J 5/017 |
| WO | WO 00/04765 A1 | 2/2000 | ............... | A01J 5/017 |
| WO | WO 00/11935 A1 | 3/2000 | ............... | A01J 5/017 |
| WO | WO 00/11936 A1 | 3/2000 | ............... | A01J 5/017 |
| WO | WO 00/11940 A1 | 3/2000 | ............... | A01K 11/00 |
| WO | WO 00/62602 A1 | 10/2000 | ............... | A01J 5/017 |
| WO | WO 01/19171 A1 | 3/2001 | ............... | A01J 5/017 |
| WO | WO 01/19172 A1 | 3/2001 | ............... | A01J 5/017 |
| WO | WO 01/52633 A1 | 7/2001 | ............... | A01J 5/017 |
| WO | WO 02/00011 A1 | 1/2002 | ............... | A01J 5/017 |
| WO | WO 02/07098 A1 | 1/2002 | ............... | G06T 7/00 |
| WO | WO 02/15676 A1 | 2/2002 | ............... | A01J 5/017 |
| WO | WO 02/082201 A1 | 10/2002 | ............... | G05D 1/02 |
| WO | WO 03/055297 A1 | 7/2003 | ............... | A01J 5/017 |
| WO | WO 2005/015985 A2 | 2/2005 | | |
| WO | WO 2006/038840 A1 | 4/2006 | ............... | A01K 1/12 |
| WO | WO 2007/050012 A1 | 5/2007 | ............... | A01J 5/017 |
| WO | WO 2007/142586 | 12/2007 | | |
| WO | WO 2008/030116 A1 | 3/2008 | ............... | A01K 1/12 |
| WO | WO 2008/058723 A1 | 5/2008 | ............... | A01J 7/02 |
| WO | WO 2008/118068 A1 | 10/2008 | ............... | A01K 1/12 |
| WO | WO 2009/093965 A1 | 7/2009 | ............... | A01J 5/017 |
| WO | WO 2010/012625 A2 | 2/2010 | ............... | A01J 5/017 |
| WO | WO 2010/014002 A9 | 2/2010 | ............... | A01K 1/12 |
| WO | WO 2010/046669 A1 | 4/2010 | ............... | A01J 5/017 |
| WO | WO 2010/110663 A1 | 9/2010 | ............... | A01J 5/017 |
| WO | WO 2010/119079 A2 | 10/2010 | ............... | A01K 1/12 |
| WO | WO 2011/098454 A1 | 8/2011 | ............... | A01K 1/12 |
| WO | WO 2011/098994 A2 | 8/2011 | ............... | A01J 5/017 |
| WO | WO 2011/102717 A1 | 8/2011 | ............... | A01K 1/12 |
| WO | WO 2011/117386 A2 | 9/2011 | ............... | A01J 5/00 |

OTHER PUBLICATIONS

Canadian Intellectual Property Office; Office Action for Application No. 2,775,130; 4 pages, Nov. 27, 2012.
Canadian Intellectual Property Office; Office Action for Application No. 2,775,177; 3 pages, Nov. 27, 2012.
U.S. Appl. No. 13/095,983, filed Apr. 28, 2011, Henk Hofman.
U.S. Appl. No. 13/095,994, filed Apr. 28, 2011, Henk Hofman.
U.S. Appl. No. 13/448,751, filed Apr. 17, 2012, Henk Hofman.
U.S. Appl. No. 13/448,799, filed Apr. 17, 2012, Henk Hofman.
U.S. Appl. No. 13/448,840, filed Apr. 17, 2012, Henk Hofman.
U.S. Appl. No. 13/448,873, filed Apr. 17, 2012, Henk Hofman.
U.S. Appl. No. 13/448,882, filed Apr. 17, 2012, Henk Hofman.
U.S. Appl. No. 13/448,897, filed Apr. 17, 2012, Henk Hofman.
U.S. Appl. No. 13/448,913, filed Apr. 17, 2012, Henk Hofman.
U.S. Appl. No. 13/448,929, filed Apr. 17, 2012, Henk Hofman.
U.S. Appl. No. 13/448,951, filed Apr. 17, 2012, Henk Hofman.
U.S. Appl. No. 13/448,993, filed Apr. 17, 2012, Henk Hofman.
U.S. Appl. No. 14/449,002, filed Apr. 17, 2012, Henk Hofman.
U.S. Appl. No. 13/449,056, filed Apr. 17, 2012, Henk Hofman.
U.S. Appl. No. 13/449,105, filed Apr. 17, 2012, Henk Hofman.
U.S. Appl. No. 13/449,142, filed Apr. 17, 2012, Henk Hofman.
U.S. Appl. No. 13/449,162, filed Apr. 17, 2012, Henk Hofman.
U.S. Appl. No. 13/449,173, filed Apr. 17, 2012, Henk Hofman.
U.S. Appl. No. 13/449,951, filed Apr. 18, 2012, Henk Hofman.
U.S. Appl. No. 13/451,248, filed Apr. 19, 2012, Henk Hofman.
U.S. Appl. No. 13/454,281, filed Apr. 24, 2012, Henk Hofman.
U.S. Appl. No. 13/454,298, filed Apr. 24, 2012, Henk Hofman.
U.S. Appl. No. 13/454,351, filed Apr. 24, 2012, Henk Hofman.
U.S. Appl. No. 13/454,386, filed Apr. 24, 2012, Henk Hofman.
U.S. Appl. No. 13/454,490, filed Apr. 24, 2012, Henk Hofman.
U.S. Appl. No. 13/454,670, filed Apr. 24, 2012, Henk Hofman.
U.S. Appl. No. 13/454,716, filed Apr. 24, 2012, Henk Hofman.
U.S. Appl. No. 13/454,833, filed Apr. 24, 2012, Henk Hofman.
U.S. Appl. No. 13/454,876, filed Apr. 24, 2012, Henk Hofman.
U.S. Appl. No. 13/454,913, filed Apr. 24, 2012, Henk Hofman.
U.S. Appl. No. 13/454,953, filed Apr. 24, 2012, Henk Hofman.
U.S. Appl. No. 13/454,975, filed Apr. 24, 2012, Henk Hofman.
Jan W. Weingarten, et al.; *A State-of-the-Art 3D Sensor for Robot Navigation*; 6 pages, Sep. 2004.
PCT International Patent Application No. PCT/NL2010/050154 entitled *Robot and Method for Milking a Cow by this Robot*; 19 pages, Mar. 25, 2010.
PCT Notification of Transmittal of the International Search Report and the Written Opinion of the International Searching Authority for Application No. PCT/US2011/047510; 9 pages, Jan. 2, 2012.
PCT Notification of Transmittal of the International Search Report and the Written Opinion of the International Searching Authority for Application No. PCT/US2011/047511; 9 pages, Jan. 2, 2012.
PCT Invitation to Pay Additional Fees and, Where Applicable, Protest Fee and Partial National Search Report for Application No. PCT/US2012/035074; 7 pages, Jul. 16, 2012.
PCT Notification of Transmittal of the International Search Report and the Written Opinion of the International Searching Authority for Application No. PCT/US2012/033894; 11 pages, Jul. 23, 2012.
Canadian Intellectual Property Office; Office Action for Application No. 2,775,132; 3 pages, Aug. 20, 2012.

(56) References Cited

OTHER PUBLICATIONS

Canadian Intellectual Property Office; Office Action for Application No. 2,775,130; 2 pages, Aug. 20, 2012.
Canadian Intellectual Property Office; Office Action for Application No. 2,775,169; 3 pages, Aug. 20, 2012.
Canadian Intellectual Property Office; Office Action for Application No. 2,775,177; 2 pages, Aug. 20, 2012.
Canadian Intellectual Property Office; Office Action for Application No. 2,775,252; 3 pages, Aug. 21, 2012.
Canadian Intellectual Property Office; Office Action for Application No. 2,783,887; 2 pages, Oct. 1, 2012.
Canadian Intellectual Property Office; Office Action for Application No. 2,784,070; 3 pages, Oct. 1, 2012.
PCT Notification of Transmittal of the International Search Report and the Written Opinion of the International Searching Authority for International Application No. PCT/US2012/035107; 28 pages, Oct. 16, 2012.
PCT Invitation to Pay Additional Fees and, Where Applicable, Protest Fee and Partial National Search Report for Application No. PCT/US2012/035077; 7 pages, Jul. 25, 2012.
PCT Invitation to Pay Additional Fees and, Where Applicable, Protest Fee and Partial National Search Report for Application No. PCT/US2012/035079; 8 pages, Jul. 31, 2012.
PCT Notification of Transmittal of the International Search Report and the Written Opinion of the International Searching Authority for Application No. PCT/US2012/033892; 13 pages, Jul. 31, 2012.
PCT Notification of Transmittal of the International Search Report and the Written Opinion of the International Searching Authority for .Application No. PCT/US2012/035356; 14 pages, Jul. 31, 2012.
PCT Invitation to Pay Additional Fees and, Where Applicable, Protest Fee and Partial National Search Report for Application No. PCT/US2012/035107; 7 pages, Jul. 31, 2012.

* cited by examiner

AUTOMATED ROTARY MILKING SYSTEM

TECHNICAL FIELD

This invention relates generally to dairy farming and more particularly to an automated rotary milking system.

BACKGROUND OF THE INVENTION

Over time, the size and complexity of dairy milking operations has increased. Accordingly, the need for efficient and scalable systems and methods that support dairy milking operations has also increased. Systems and methods supporting dairy milking operations, however, have proven inadequate in various respects.

SUMMARY OF THE INVENTION

According to embodiments of the present disclosure, disadvantages and problems associated with previous systems supporting dairy milking operations may be reduced or eliminated.

In certain embodiments, a milking system includes a rotary milking platform having a plurality of milking stalls and a plurality of milking devices, each milking device configured for attachment to the teats of a dairy livestock located in a corresponding milking stall of the rotary milking platform. The system further includes one or more robotic devices operable to perform one or more functions, including preparing the teats of a dairy livestock for the attachment of a milking apparatus, attaching a milking apparatus to the teats of a dairy livestock, and applying a sanitizing agent to the teats of a dairy livestock subsequent to the removal of a milking apparatus from the teats of the dairy livestock. Each of the one or more functions performed by the one or more robotic devices is performed during a period of time when the rotary milking platform is substantially stationary.

Particular embodiments of the present disclosure may provide one or more technical advantages. For example, the use of robotic devices in conjunction with a rotary milking platform may increase the throughput of the milking system, thereby increasing the overall milk production of the milking platform. Additionally, because the various milking functions are performed while the milking platform is substantially stationary, the number of robotic devices needed to perform those functions may be minimized. As a result, the upfront cost associated with the milking system may be reduced. Furthermore, because the various milking functions are performed by one or more robotic devices as opposed to human laborers (which may be expensive and/or difficult to find), the cost associated with operating the milking system may be reduced.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Figure 1:
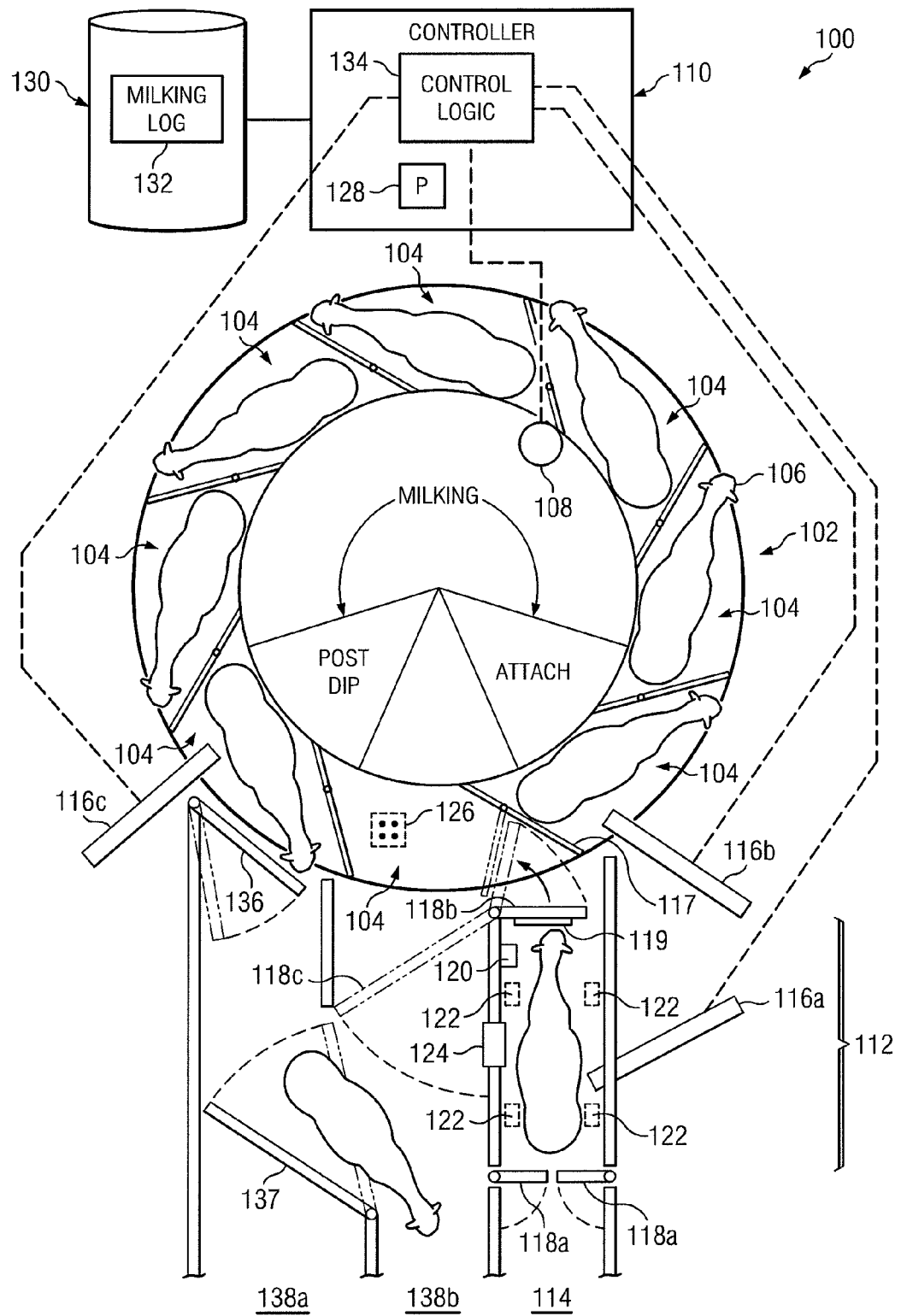
FIG. 1 illustrates a top view of an example automated rotary milking system, according to certain embodiments of the present disclosure.

FIG. 1 illustrates a top view of an example automated rotary milking system 100, according to certain embodiments of the present disclosure. System 100 includes a rotary milking platform 102 having a number of milking stalls 104 each configured to facilitate milking of dairy livestock 106. A rotary drive mechanism 108 coupled to rotary milking platform 102 is operable to control the rotation of rotary milking platform 102 (e.g., in response to signals received from controller 110). System 100 further includes a preparation stall 112 positioned between a holding pen 114 and one or more milking stalls 104 of rotary milking platform 102, and one or more robotic devices 116 positioned proximate to rotary milking platform 102 and/or preparation stall 112. Although this particular implementation of system 100 is illustrated and primarily described, the present invention contemplates any suitable implementation of system 100 according to particular needs. Additionally, although the present disclosure contemplates system 100 facilitating the milking of any suitable dairy livestock 106 (e.g., cows, goats, sheep, water buffalo, etc.), the remainder of this description is detailed with respect to dairy cows.

Rotary milking platform 102 may include any suitable combination of structure and materials forming a circular platform having a number of milking stalls 104 positioned around the perimeter of the platform such that the milking stalls 104 rotate about a center point as dairy cows in milking stalls 104 are milked. As one particular example, rotary milking platform 102 may have a diameter of one hundred fifty-five inches and may include eight equally-sized milking stalls 104 positioned around the perimeter of the platform. In certain embodiments, each milking stall 104 may include a stall gate 117 configured to control the flow of dairy cows 106 into the milking stall 104 from preparation stall 112. Additionally, stall gates 117 may each be coupled to one or more actuators operable to open/close stall gates 117 in response to receipt of a signal from controller 110 (as described in further detail below). Although a rotary milking platform 102 having a particular size and a particular number of stalls 104 is illustrated, the present disclosure contemplates a rotary milking platform 102 having any suitable size and including any suitable number of stalls 104.

Rotary milking platform 102 may be coupled (e.g., via one or more gears or any other suitable power transmission mechanism) to a rotary drive mechanism 108. Rotary drive mechanism 108 may include a motor (e.g., a hydraulic motor, an electric motor, or any other suitable motor) operable to impart a variable amount of rotational force on rotary milking platform 102 via one or more gears. In certain embodiments, rotary drive mechanism 108 may be operable to start/stop the rotation of rotary milking platform 102 in response to receipt of a signal from controller 110 (as described in further detail below).

Preparation stall 112 may be positioned proximate to both holding pen 114 and rotary milking platform 102 such that a dairy cow 106 in holding pen 114 may enter preparation stall 112 prior to entering a milking stall 104 of rotary milking platform 102. Preparation stall 112 may include any suitable number of walls constructed of any suitable materials arranged in any suitable configuration operable to prevent movement of dairy cows 106. For example, the walls of preparation stall 112 may each include any number and combination of posts, rails, tubing, rods, connectors, cables, wires, and/or beams operable to form a substantially planar barricade such as a fence, wall, and/or other appropriate structure suitable to prevent movement of dairy cows 106.

Preparation stall 112 may include an entrance gate 118a controlling the flow of dairy cows 106 into preparation stall 112 from holding pen 114, an exit gate 118b controlling the flow of dairy cows 106 from preparation stall 112 into a milking stall 104 of rotary milking platform 102, and a sorting gate 118c allowing dairy cows to return to holding pen 114. In certain embodiments, gates 118 may each be coupled to one or more actuators operable to open/close gates 118 in response to receipt of a signal from controller 110 (as described in further detail below).

In certain embodiments, preparation stall 112 may include a feed manger 119 (e.g., coupled to exit gate 118b). Feed manger 119 may be operable to dispense feed (e.g., in response to receipt of a signal from controller 110) in order to entice dairy cows 106 to enter preparation stall 112.

In certain embodiments, preparation stall 112 may additionally include an identification device 120 operable to identify a dairy cow located in preparation stall 112. For example, identification device 120 may comprise any suitable radio-frequency identification (RFID) reader operable to read an RFID tag of a dairy cow 106 (e.g., an RFID ear tag). In certain embodiments, identification device 120 may communicate the identity of a dairy cow 106 located in preparation stall 112 (e.g., a tag number) to controller 110, which may determine (e.g., based on a milking log 132 stored in memory 130) if it is an appropriate time to milk the identified dairy cow 106 (as described in further detail below).

In certain embodiments, preparation stall 112 may additionally include one or more load cells 122 (e.g., one or more scales or other suitable devices) operable to determine a weight for a dairy cow located in the preparation stall 112 and/or a vision system 124 (e.g., a camera or other suitable device) operable to determine the size of a dairy cow located in preparation stall 112. Load cells 122 and vision system 124 may each be communicatively coupled (e.g., via wireless or wireline communication) to controller 110 such that a determined weight and size associated with a dairy cow 106 in preparation stall 112 may be communicated to controller 110. Controller 110 may associate the determined weight and size of the dairy cow 106 with the identification of the dairy cow 106 such that information associated with the dairy cow 106 stored in milking log 132 may be updated.

Robotic devices 116 may each comprise any suitable robotic device constructed from any suitable combination of materials (e.g., controllers, actuators, software, hardware, firmware, etc.) operable to perform certain functions associated with the milking of dairy cows 106 in an automated manner (as described in further detail below). In certain embodiments, robotic devices 116 may include an arm operable to rotate about a pivot point such that robotic devices 116 may extend beneath a dairy cow 106 to perform functions associated with the milking of the dairy cows 106 and retract from beneath the dairy cow 106 once those functions have been completed.

In certain embodiments, robotic devices 116 of system 100 may include a preparation robot 116a, an attachment robot 116b, and a post dip robot 116c. Preparation robot 116a may be positioned proximate to preparation stall 112 such that preparation robot 116a may extend and retract from beneath a dairy cow 106 located in preparation stall 112. Preparation robot 116a may be operable to prepare the teats of a dairy cow 106 located in preparation stall 112 for the attachment of a milking apparatus 126. In certain embodiments, preparing the teats of a dairy cow 106 for the attachment of a milking apparatus 126 may include applying a sanitizing agent to the teats of a dairy cow 106, cleaning the teats of the dairy cow, stimulating the teats of the dairy cow 106, and any other suitable procedures.

Attachment robot 116b may be positioned proximate to rotary milking platform 102 such that attachment robot 116b may extend and retract from beneath a dairy cow 106 located in a milking stall 104 located at a first rotational position of rotary milking platform 102 (the "attach position"). Attachment robot 116b may be operable to perform functions including attaching a milking apparatus 126 to the teats of a dairy cow 106 in the milking stall 104 located at the attach position. The attached milking apparatus 126 may be stored beneath the floor of the milking stall 104 (or at any other suitable location) such that the milking apparatus is accessible by attachment robot 116b.

Post dip robot 116c may be positioned proximate to rotary milking platform 102 such that post dip robot 116c may extend and retract from beneath a dairy cow 106 located in a milking stall 104 located at a second rotational position of rotary milking platform 102 (the "post dip position"). Post dip robot 116c may be operable to perform functions including applying a sanitizing agent to the teats of a dairy cow 106 in the milking stall 104 located at the post dip position (subsequent to the removal of a milking apparatus 126 from the teats of the dairy cow 106). In certain embodiments, each of the above-described functions performed by preparation robot 116a, attachment robot 116b, and post dip robot 116c are performed while rotary milking platform 102 is substantially stationary (as controlled by controller 110 in conjunction with rotary drive mechanism 108, as described in further detail below).

In certain embodiments, various components of system 100 (e.g., rotary drive mechanism 108, actuators coupled to gates 118 of preparation stall 112, and robotic devices 116) may each be communicatively coupled (e.g., via a network facilitating wireless or wireline communication) to controller 110, which may initiate/control the automated operation of those devices (as described in further detail below). Controller 110 may include one or more computer systems at one or more locations. Each computer system may include any appropriate input devices (such as a keypad, touch screen, mouse, or other device that can accept information), output devices, mass storage media, or other suitable components for receiving, processing, storing, and communicating data. Both the input devices and output devices may include fixed or removable storage media such as a magnetic computer disk, CD-ROM, or other suitable media to both receive input from and provide output to a user. Each computer system may include a personal computer, workstation, network computer, kiosk, wireless data port, personal data assistant (PDA), one or more processors within these or other devices, or any other suitable processing device. In short, controller 110 may include any suitable combination of software, firmware, and hardware.

Controller 110 may additionally include one or more processing modules 128. Processing modules 128 may each include one or more microprocessors, controllers, or any other suitable computing devices or resources and may work, either alone or with other components of system 100, to provide a portion or all of the functionality of system 100 described herein.

Controller 110 may additionally include (or be communicatively coupled to via wireless or wireline communication) memory 130. Memory 130 may include any memory or database module and may take the form of volatile or non-volatile memory, including, without limitation, magnetic media, optical media, random access memory (RAM), read-only memory (ROM), removable media, or any other suitable local or remote memory component. Memory 130 may store a milking log 132, which may be a table listing each dairy cow 106 which may enter a milking stall 104 of rotary milking platform 102 along with information associated with each dairy cow 106 (e.g., milking history, weight, and size). Although milking log 132 is depicted and primarily described as being stored in memory 130, the present disclosure contemplates milking log 132 being stored at any other suitable location in system 100.

In certain embodiments, controller 110 may include control logic 134 (e.g., stored in memory module 130), which may include any information, logic, and/or instructions stored and/or executed by controller 110 to control the automated operation of system 100, as described below. For example, in response to control logic 134, processor 128 may (1) communicate signals to actuators coupled to gates 118 to initiate opening/closing of those gates, (2) communicate signals to rotary drive mechanism 108 to initiate the starting/stopping of rotary milking platform 102, and (3) communicate signals to robotic devices 116 to initiate performance of the above-described functions associated with those robotic devices 116. Additionally, in response to control logic 134, processor 128 may be operable to update milking log 132 of in response to information associated with dairy cows 106 received from various components of system 100 (e.g., identification device 120, load cells 122, vision system 124, and milking apparatus 126).

In operation of an example embodiment of system 100, controller 110 may receive a signal indicating the presence of a dairy cow 106 located in preparation stall 112. The signal indicating the presence of a dairy cow 106 in preparation stall 112 may be received from a presence sensor associated with preparation stall 112 or from any other suitable component of system 100 (e.g., identification device 120). Additionally, controller 110 may receive a signal from identification device 120, which may include the identity (e.g., tag number) of the dairy cow 106. Based on the identity of the dairy cow 106 in preparation stall 112, controller 110 may determine if it is an appropriate time to milk the identified dairy cow 106.

For example, controller 110 may access milking log 132 stored in memory 130, which may include the date/time that the identified dairy cow 106 was last milked. If it is determined that the amount of time elapsed since the identified dairy cow 106 was last milked is greater than a predefined amount of time, controller 110 may determine that it is an appropriate time to milk the identified dairy cow 106; otherwise, controller 110 may determine it is not an appropriate time to milk the identified dairy cow 106. As an additional example, controller 110 may access milking log 132 stored in memory 130, which may include the amount of milk collected from the identified dairy cow 106 during a previous time period (e.g., the previous eight to twelve hours). If the amount of milk collected during the previous time period is less than a predefined amount associated with the identified dairy cow 106, controller 110 may determine that it is an appropriate time to milk the identified dairy cow 106; otherwise, controller 110 may determine it is not an appropriate time to milk the identified dairy cow 106.

Additionally, controller 110 may be operable to update information associated with the identified dairy cow 106 in milking log 132 based on information received from additional components of system 100. For example, controller 110 may be operable to update the weight of the identified dairy cow 106 based on information received from load cells 122 of preparation stall 112. Additionally, controller 110 may be operable to update the size of the identified dairy cow 106 based on information received from vision system 124 of preparation stall 112.

If controller 110 determines that it is not an appropriate time to milk the identified dairy cow 106, controller 110 may generate a signal to be communicated to an actuator coupled to sorting gate 118c of preparation stall 112, the communicated signal initiating the opening of sorting gate 118c such that the identified dairy cow 106 may return to holding pen 114 to be milked at a later time.

If controller 110 determines that it is an appropriate time to milk the identified dairy cow 106, feed manger 119 (e.g., in response to a signal received from controller 110) may open in order to provide feed to the identified dairy cow 106. Additionally, preparation robot 116a (e.g., in response to a signal received from controller 110) may position itself beneath the identified dairy cow 106 and prepare the teats of the identified dairy cow 106 for the attachment of a milking apparatus 126 (e.g., by applying a sanitizing agent to the teats of the identified dairy cow 106, cleaning the teats of the identified dairy cow 106, and stimulating the teats of the identified dairy cow 106). Once preparation robot 116a has prepared the teats of the identified dairy cow 106, controller 110 may generate signals to be communicated to actuators coupled to exit gate 118b and the stall gate 117 of the milking stall 104 located adjacent to preparation stall 112, the communicated signals initiating the opening of exit gate 118b and the stall gate 117 such that the identified dairy cow 106 may enter a milking stall 104 of rotary milking platform 102. Once the identified dairy cow 106 has fully entered a milking stall 104, controller 110 may (1) communicate signals to the actuators coupled exit gate 118b and stall gate 117, the signals initiating the closing of exit gate 118b and stall gate 117, (2) communicate a signal to entrance gate 118a of preparation stall 112, the signal initiating the opening of entrance gate 118a such that a next dairy cow 106 may enter preparation stall 112, and (3) communicate a signal to rotary drive mechanism 108, the signal initiating an incremental rotation of rotary milking platform 102 such that the milking stall 104 in which the identified dairy cow 106 is located moves to a first rotational position of rotary milking platform 102 (the "attach" position).

With the rotary milking platform 102 being substantially stationary and the milking stall 104 of the identified dairy cow 106 being located at the attach position, attachment robot 116b (e.g., in response to a signal received from controller 110) may position itself beneath the identified dairy cow 106 and attach a milking apparatus 126 to the teats of the identified dairy cow 106. For example, attachment robot 116b may access a milking apparatus 126 corresponding to the milking stall 104 of the identified dairy cow 106 from a known storage position within the milking stall 104 (e.g., beneath the floor of the milking stall 104) and attach the accessed milking apparatus 126 to the teats of the identified dairy cow 106.

Once attachment robot 116b has attached the milking apparatus 126 to the teats of the identified dairy cow 106 (and possibly after a next dairy cow 106 has fully entered a milking stall 104 from preparation stall 112, as described above), controller 110 may communicate a signal to rotary drive mechanism 108, the signal initiating a further incremental rotation of rotary milking platform 102 (e.g., an amount corresponding to a single milking stall 104). As rotary milking platform 102 completes subsequent incremental rotations, the identified dairy cow 106 is milked, with the milking apparatus 126 being detached and withdrawn (e.g., by retracting the milking apparatus 126 to the known storage position within the milking stall 104) once milking is complete. With milking complete, the identified dairy cow 106 continues to complete incremental rotations until the milking stall 104 in which the identified dairy cow 106 is located reaches a second rotational position (the "post dip position").

With the rotary milking platform 102 being substantially stationary and the milking stall 104 of the identified dairy cow 106 being located at the post dip position, post dip robot 116c (e.g., in response to a signal received from controller 110) may position itself beneath the identified dairy cow 106 and apply a sanitizing agent to the teats of the identified dairy cow 106. In certain embodiments, the post dip position may be located adjacent to an exit gate 136 leading to an exit pen 138. Once post dip robot 116c has applied the sanitizing agent, control logic 134 may communicate a signal to an actuator coupled to exit gate 136, the signal initiating the opening of exit gate 136 such that the identified dairy cow 106 may exit the milking stall 104 and enter the exit pen 138. In certain embodiments, exit pen 138 may be divided into an exit pen 138a and a catch pen 138b, and an exit sorting gate 137 may facilitate the sorting of exiting dairy cows between exit pen 138a and catch pen 138b. If controller 110 determines that the identified cow 106 was not fully milked or that the milking apparatus 126 was detached prematurely (e.g., using historical milking data stored in milking log 132), controller 110 may not communicate a signal to the actuator coupled to exit gate 136, forcing the identified dairy cow 106 to complete another milking rotation (as described above).

Although a particular implementation of system 100 is illustrated and primarily described, the present disclosure contemplates any suitable implementation of system 100, according to particular needs. Moreover, although robotic devices 116 of system 100 have been primarily described as being located at particular positions relative to milking platform 102 and/or preparation stall 112, the present disclosure contemplates robotic devices 116 being positioned at any suitable location, according to particular needs.

Figure 2:
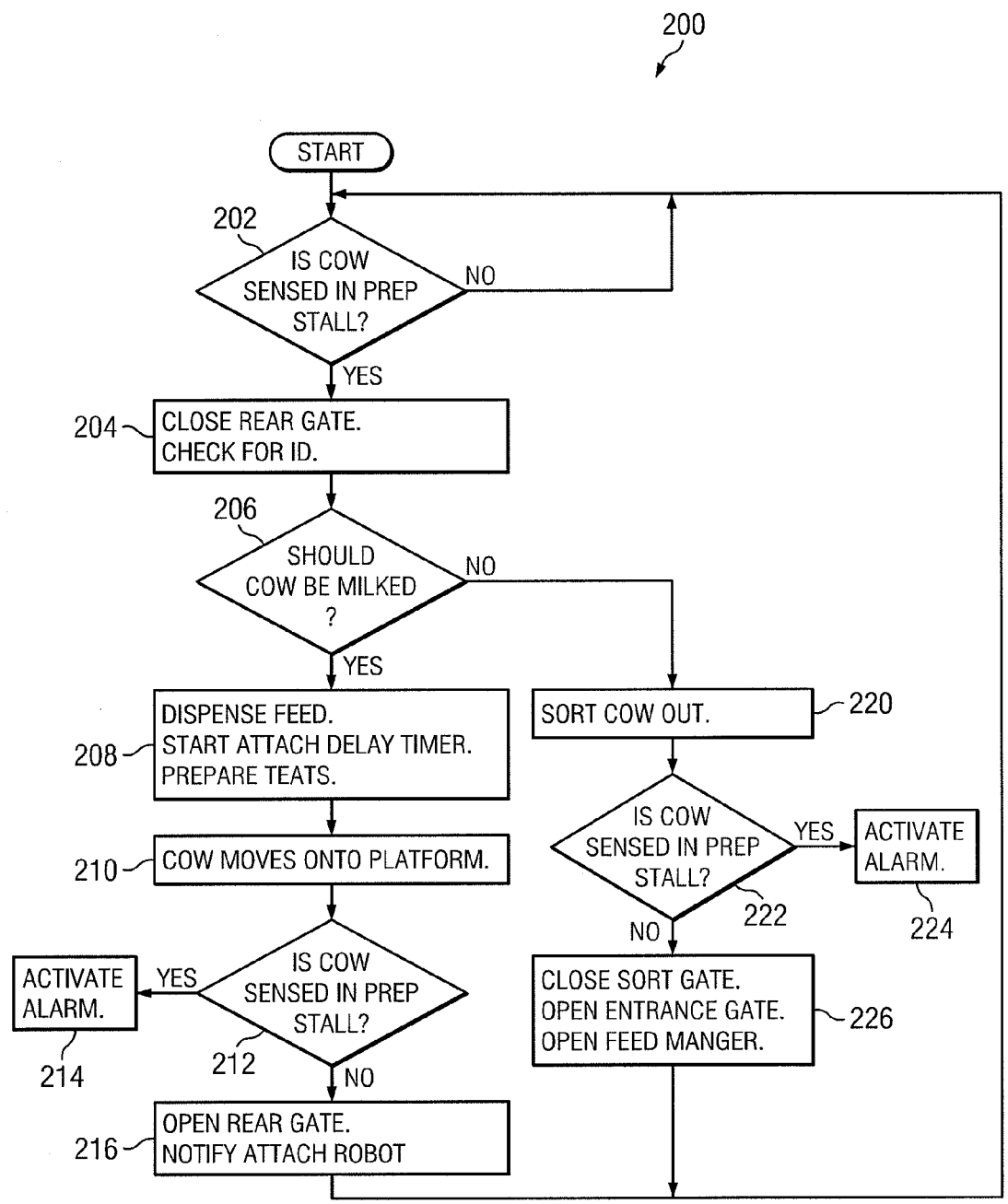
FIG. 2 illustrates an example method of operation associated with a preparation robot of the example automated rotary milking system of FIG. 1, according to certain embodiments of the present disclosure.

FIG. 2 illustrates an example method of operation 200 associated with preparation robot 116a of system 100, according to certain embodiments of the present disclosure. At step 202, controller 110 determines whether a dairy cow 106 is present in preparation stall 112 (e.g., based on a signal received from identification device 120, load cells 122, vision system 124, or any other suitable presence sensor). At step 204, controller 110 generates a signal to be communicated to an actuator coupled to entrance gate 118a of preparation stall 112, the communicated signal initiating closing of entrance gate 118a such that the dairy cow 106 may not exit preparation stall 112. Additionally, at step 204, controller 110 waits for receipt of a signal from identification device 120 identifying the dairy cow 106 located in preparation stall 112 (e.g., a unique identification number associated with the dairy cow 106). Controller 110 may wait a predefined amount of time for receipt of a signal identifying the dairy cow 106 in preparation stall 112. If a signal identifying the dairy cow 106 in preparation stall 112 is received within the predefined period of time, the method continues to step 206. Otherwise, controller 110 may store a message in milking log 132, the message indicating that the unidentified dairy cow 106 (1) is not to be milked, and (2) is to be sorted into catch pen 138b (using exit sorting gate 137) upon exiting a milking stall 104 of rotary milking platform 102.

At step 206, controller 110 determines whether it is an appropriate time to milk the identified dairy cow 106 located in preparation stall 112. For example, controller 110 may access milking log 132, which may include the date/time that the identified dairy cow 106 was last milked. If it is determined that the amount of time elapsed since the identified dairy cow 106 was last milked is greater than a predefined amount of time, controller 110 may determine that it is an appropriate time to milk the identified dairy cow 106. Otherwise, controller 110 may determine it is not an appropriate time to milk the identified dairy cow 106.

If controller 110 determines at step 206 that it is an appropriate time to milk the identified dairy cow 106, at step 208 (1) feed manger 119 (e.g., in response to a signal received from controller 110) may dispense feed for the identified dairy cow 106, and (2) preparation robot 116a (e.g., in response to a signal received from controller 110) may position itself beneath the identified dairy cow 106 and prepare the teats of the identified dairy cow 106 for the attachment of a milking apparatus 126 (e.g., by applying a first sanitizing agent to the teats of the identified dairy cow 106, cleaning the teats of the identified dairy cow 106, and stimulating the teats of the identified dairy cow 106). Preparation robot 116a may additionally start the attach delay timer. Once preparation robot 116a has prepared the teats of the dairy cow 106, the method proceeds to step 210. At step 210, controller 110 may (1) generate signals to be communicated to actuators coupled exit gate 118b of preparation stall 112 and stall gate 117 of the milking stall located adjacent to preparation stall 112, the communicated signals initiating the opening of exit gate 118b and stall gate 117 such that the identified dairy cow 106 may enter the milking stall 104 of rotary milking platform 102, and (2) communicate a signal to feed manger 119, the signal causing feed manger 119 to stop providing feed to the identified dairy cow 106.

At step 212, controller 110 determines if the identified dairy cow 106 has exited the preparation stall 112. If the dairy cow 106 has failed to exit preparation stall 112 and enter a milking stall 104, the method proceeds to step 214. At step 214, the dairy cow 106 may be pushed out of preparation stall 112 (e.g., using noise, light, or a mechanical device). If the dairy cow 106 still fails to exit preparation stall 112, an alarm is sounded. Once the dairy cow 106 has exited the preparation stall 112 and fully entered a milking stall 104, the method proceeds to step 216. At step 216, controller 110 may (1) communicate signals to the actuators coupled exit gate 118b and stall gate 117, the signals initiating the closing of exit gate 118b and stall gate 117, (2) communicate a signal to entrance gate 118a of preparation stall 112, the signal initiating the opening of entrance gate 118a such that a next dairy cow 106 may enter preparation stall 112, (3) communicate a signal to rotary drive mechanism 108, the signal initiating an incremental rotation of rotary milking platform 102 such that the milking stall 104 in which the dairy cow 106 is located moves to a first rotational position of rotary milking platform 102 (the "attach" position), and (4) communicate a signal to feed manger 119 located in the preparation stall 112, the signal causing feed manger 119 to open in order to attract a next dairy cow 106 to preparation stall 112. The method then continues to step 202 where a determination is made whether a next dairy cow 106 has entered preparation stall 112.

Returning to step 206, if controller 110 determines that it is not an appropriate time to milk the identified dairy cow 106, the method proceeds to step 220. At step 220, controller 110 may communicate a signal to an actuator coupled to sorting gate 118c of preparation stall 112, the communicated signal initiating the opening of sorting gate 118c such that the dairy cow 106 may return to holding pen 114 to be milked at a later time. Additionally, controller 110 may communicate a signal to feed manger 119, the signal causing feed manger 119 to close, preventing the dairy cow 106 located in the preparation stall 112 from accessing the feed. At step 222, controller 110 determines if the dairy cow 106 has exited the preparation stall 112. If it is determined at step 222 that the dairy cow 106 has failed to exit preparation stall 112, the dairy cow 106 may be pushed out of preparation stall 112 (e.g., using noise, light, or a mechanical device) at step 224. If the dairy cow 106 still fails to exit preparation stall 112, an alarm is sounded. Alternatively, if it is determined at step 222 that the dairy cow 106 has exited the preparation stall 112, the method proceeds to step 226. At step 226, controller 110 may (1) communicate a signal to the actuator coupled to sorting gate 118c, the signal initiating the closing of sorting gate 118c, (2) communicate a signal to an actuator coupled to entrance gate 118a of preparation stall 112, the communicated signal initiating the opening of entrance gate 118a, and (3) communicate a signal to feed manger 119, the signal causing feed manger 119 to open in order to attract another dairy cow 106 to preparation stall 112. The method then returns to step 202.

Figure 3:
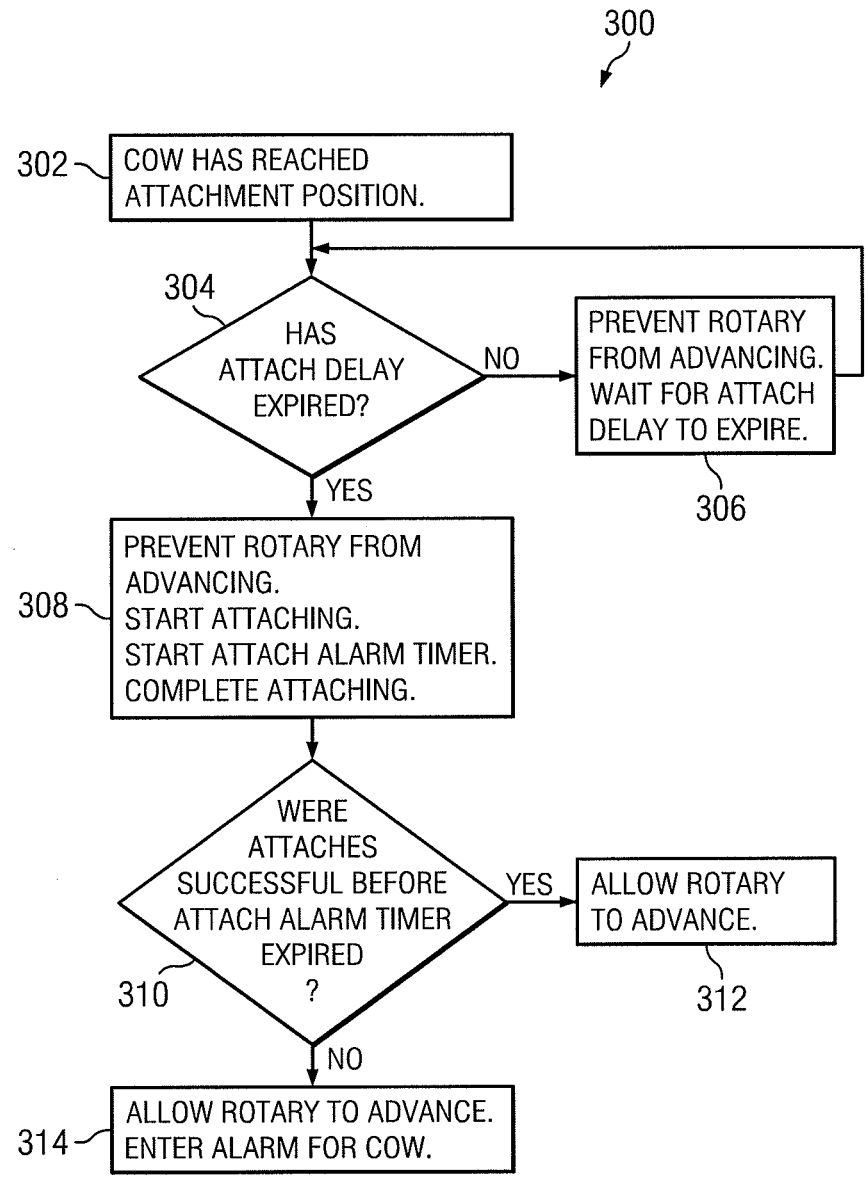
FIG. 3 illustrates an example method of operation associated with an attachment robot of the example automated rotary milking system of FIG. 1, according to certain embodiments of the present disclosure.

FIG. 3 illustrates an example method of operation 300 associated with attachment robot 116b of system 100, according to certain embodiments of the present disclosure. The method begins at step 302 with a dairy cow 106 in a milking stall 104 located at a first rotational position of rotary milking platform 102 (the "attach position"). At step 304, controller 110 determines whether a predefined attach delay period has expired. If the predefined attach delay period has not expired, the method proceeds to step 306. At step 306, rotary milking platform 102 remains substantially stationary and controller 110 waits for the expiration of the predefined attach delay period. Once the predefined attach delay period has expired, the method proceeds to step 308.

At step 308, rotary milking platform 102 remains substantially stationary and attachment robot 116b (e.g., in response to a signal received from controller 110) positions itself beneath the dairy cow 106 and attaches a milking apparatus 126 to the teats of the dairy cow 106. At step 310, controller 110 determines whether the attachment was successful prior to the expiration of a predefined period of time. If the attachment is determined to be successful prior to the expiration of the predefined period of time, the method proceeds to step 312.

At step 312, controller 110 may communicate a signal to rotary drive mechanism 108, the signal initiating a further incremental rotation of rotary milking platform 102 (e.g., an amount corresponding to a single milking stall 104). If the attachment is determined not to be successful prior to the expiration of predefined amount of time, the method proceeds to step 314. At step 314, controller 110 may communicate a signal to rotary drive mechanism 108, the signal initiating a further incremental rotation of rotary milking platform 102 (e.g., an amount corresponding to a single milking stall 104). Additionally, at step 314 an alarm may be entered for the dairy cow 106 indicating that the attachment of milking apparatus 126 was unsuccessful (e.g., by amending milking log 132).

Figure 4:
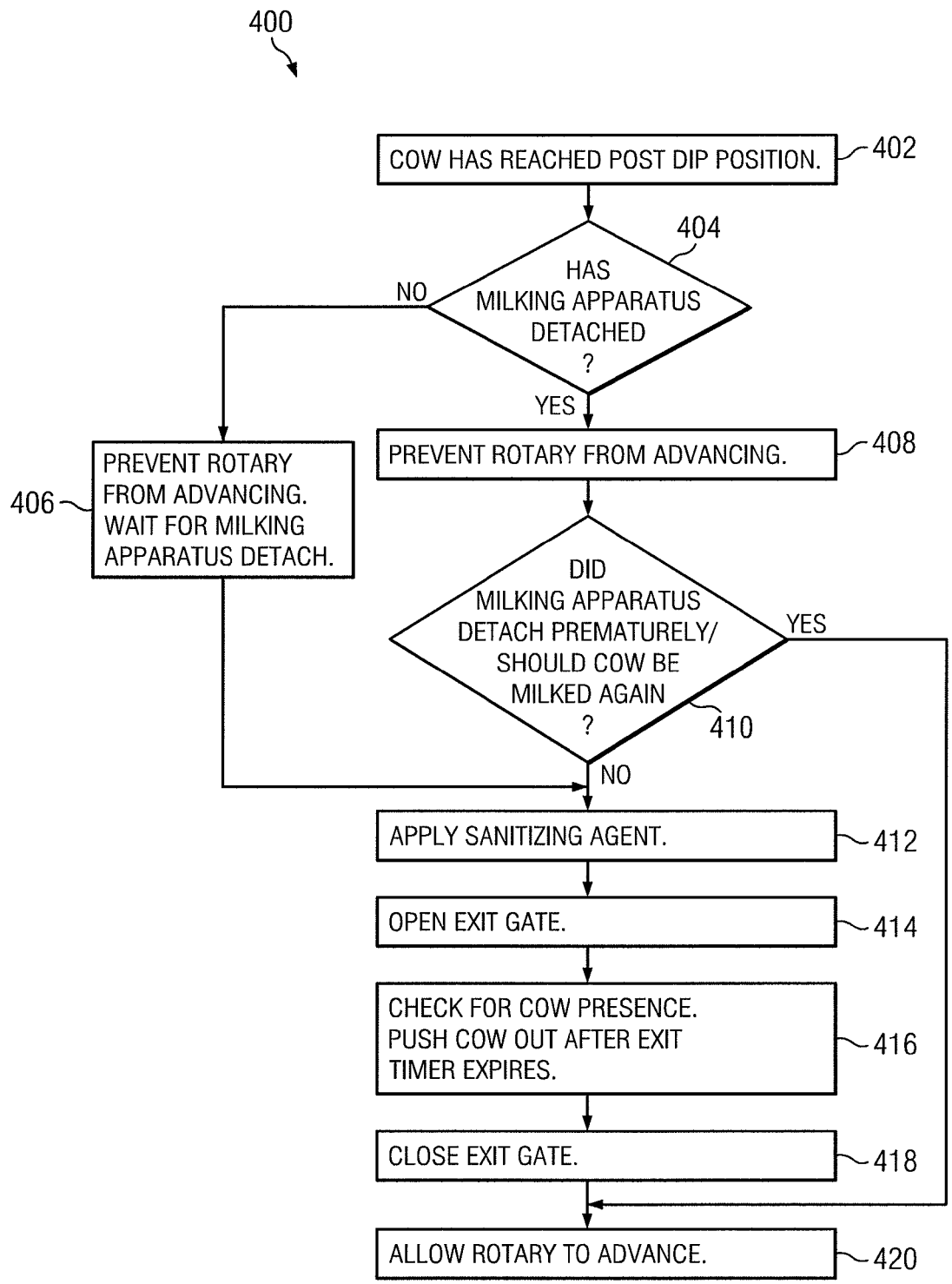
FIG. 4 illustrates an example method of operation associated with a post dip robot of the example automated rotary milking system of FIG. 1, according to certain embodiments of the present disclosure.

FIG. 4 illustrate an example method of operation 400 associated with post dip robot 116c of system 100, according to certain embodiments of the present disclosure. The method begins at step 402 with a dairy cow 106 in a milking stall 104 located at a second rotational position of rotary milking platform 102 (the "post dip position"). At step 404, controller 110 determines whether the milking apparatus 126 previously attached to the teats of the dairy cow 106 has detached. If controller 110 determines that the milking apparatus 126 has not yet detached, the method proceeds to step 406. At step 406, controller 110 waits, with the rotary milking platform 102 remaining substantially stationary, for a signal indicating that the milking apparatus 126 has detached before proceeding to step 412 (described below). If controller 110 determines that the milking apparatus 126 has detached, the method proceeds to step 408.

At step 408, controller 110 prevents rotary milking platform 102 from advancing (i.e., rotary milking platform 102 remains substantially stationary). At step 410, controller 110 determines if the milking apparatus 126 detached prematurely (i.e., before milking of the dairy cow 106 was complete). If controller 110 determines that the milking apparatus detached prematurely, the method proceeds directly to step 420 (described below). If controller 110 determines that the milking apparatus did not detach prematurely, the method proceeds to step 412.

At step 412, rotary milking platform 102 remains substantially stationary and post dip robot 116c (e.g., in response to a signal received from controller 110) positions itself beneath the dairy cow 106 and applies a sanitizing agent to the teats of the dairy cow 106. At step 414, controller 110 communicates a signal to an actuator coupled to exit gate 136, the signal initiating the opening of exit gate 136 such that the dairy cow 106 may exit the milking stall 104 and enter the exit pen 138. At step 416, a check is made to see if the dairy cow 106 has exited the milking stall 104. If the dairy cow 106 has failed to exit the milking stall 104 within a predefined time, the dairy cow 106 may be pushed out of the milking stall 104 (e.g., using noise, light, or a mechanical device). At step 418, controller 110 communicates a signal to the actuator coupled to exit gate 136, the signal initiating the closing of exit gate 136. At step 420, controller 110 may communicate a signal to rotary drive mechanism 108, the signal initiating a further incremental rotation of rotary milking platform 102 (e.g., an amount corresponding to a single milking stall 104).

Figures 5, 7:
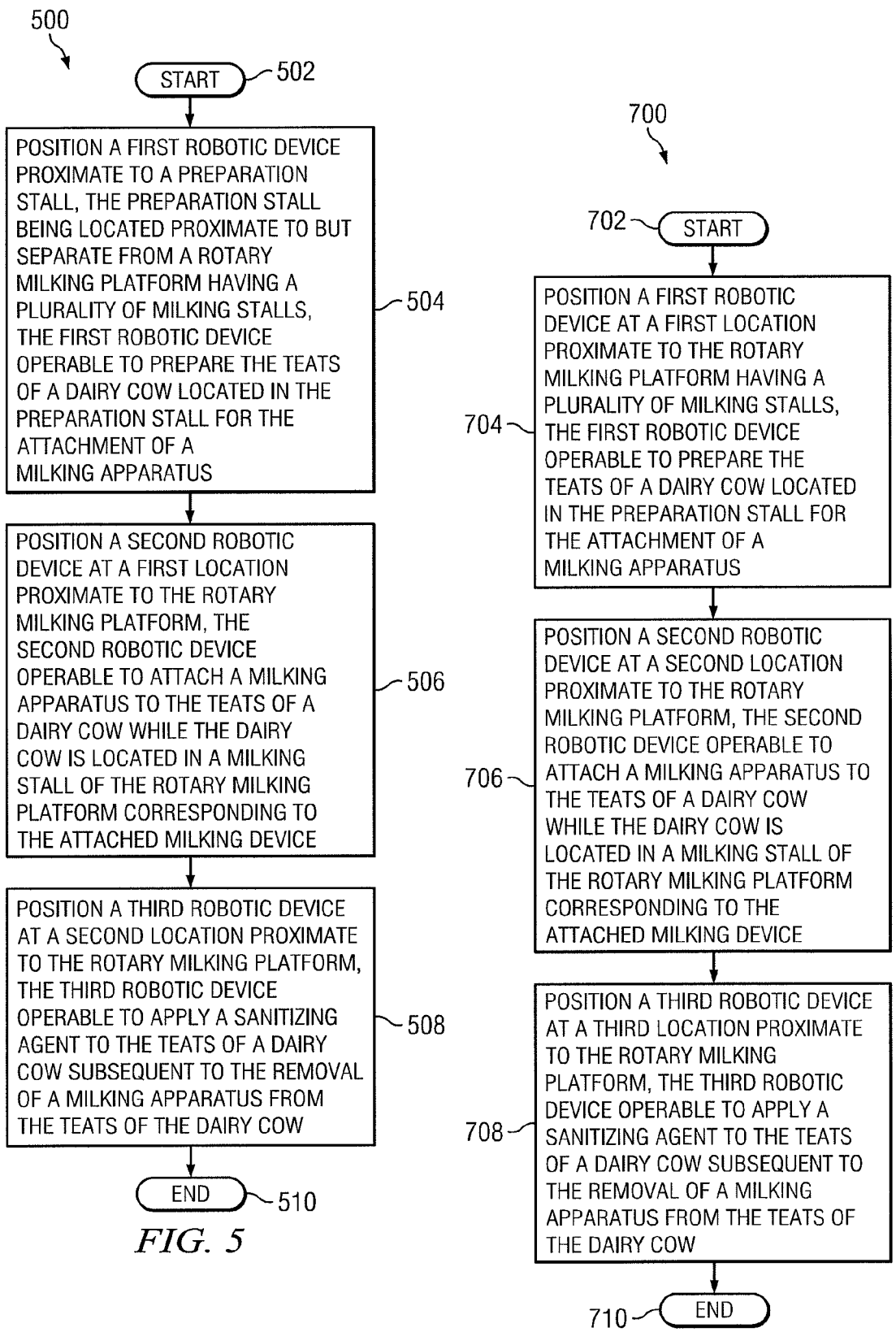
FIG. 5 illustrates an example method for installation of the automated rotary milking system depicted in FIG. 1, according to certain embodiments of the present disclosure.
FIG. 7 illustrates an example method for installation of the automated rotary milking system depicted in FIG. 6, according to certain embodiments of the present disclosure.

FIG. 5 illustrates an example method 500 of installation of the automated rotary milking system 100 depicted in FIG. 1, according to certain embodiments of the present disclosure. The method begins at step 502. At step 504, first robotic device 116a (i.e., preparation robot 116a) is positioned proximate to preparation stall 112 such that preparation robot 116a may position itself beneath a dairy cow 106 located in preparation stall 112 in order to prepare the teats of the dairy cow 106 for the attachment of a milking apparatus 126. At step 506, second robotic device 116b (i.e., attachment robot 116b) is positioned at a first location proximate to rotary milking platform 102. The first location at which attachment robot 116*b* is positioned may correspond to the location of a milking stall 104 located at a first rotational position of rotary milking platform 102 (the "attach position") such that attachment robot 116*b* may position itself beneath a dairy cow 106 in a milking stall 104 located at the attach position in order to attach a milking apparatus 126 to the teats of the dairy cow 106. At step 508, third robotic device 116*c* (i.e., post dip robot 116*c*) is positioned at a second location proximate to rotary milking platform 102. The second location at which post dip robot 116*c* is positioned may correspond to the location of a milking stall 104 located at a second rotational position of rotary milking platform 102 (the "post dip position") such that post dip robot 116*c* may position itself beneath a dairy cow 106 in a milking stall 104 located at the post dip position in order to apply a sanitizing agent to the teats of the dairy cow 106. The method ends at step 510.

Although the steps of method 500 have been described as being performed in a particular order, the present disclosure contemplates that the steps of method 500 may be performed in any suitable order, according to particular needs.

Figure 6:
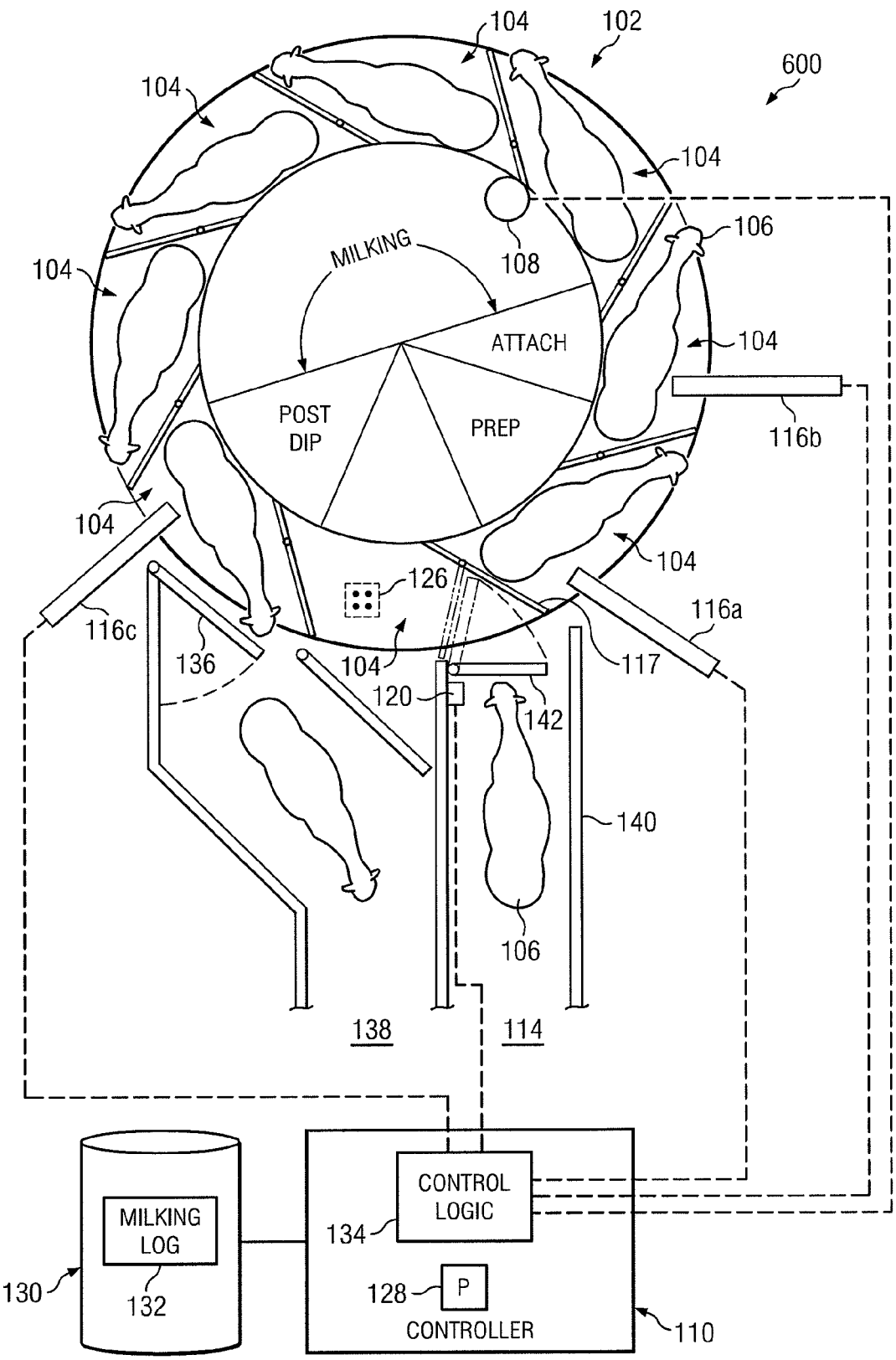
FIG. 6 illustrates a top view of an alternative example automated rotary milking system, according to certain embodiments of the present disclosure.

FIG. 6 illustrates a top view of an alternative example automated rotary milking parlor system 600, according to certain embodiments of the present disclosure. System 600 includes a rotary milking platform 102 having a number of milking stalls 104, a rotary drive mechanism 108 coupled to the rotary milking platform 102, a number of robotic devices 116, and a controller 110 including control logic 134 (like-numbered components being substantially similar to those discussed above with regard to FIG. 1).

Additionally, rather than a preparation stall 112 positioned between holding pen 114 and milking stalls 104 of rotary milking platform 102, system 600 may include an entrance lane 140. Entrance lane 140 may include any suitable number of walls each constructed of any suitable materials arranged in any suitable configuration operable to encourage the orderly movement of dairy cows. For example, the walls of entrance lane 140 may each include any number and combination of posts, rails, tubing, rods, connectors, cables, wires, and/or beams operable to form a substantially planar barricade such as a fence, wall, and/or other appropriate structure suitable to encourage the orderly movement of dairy cows 106. By decreasing the effective area of holding pen 114 (e.g., using a crowd gate), the dairy cows 106 are encouraged to pass one at a time though entrance lane 140 and into milking stalls 104 of rotary milking platform 102. Entrance lane 140 may additionally include an entrance lane gate 142 for controlling the flow of dairy cows 104 into milking stalls 104 (to prevent dairy cows 106 from becoming injured by attempting to enter a milking stall 104 while rotary milking platform 102 is rotating).

Robotic devices 116 of system 600 may include a preparation robot 116*a*, an attachment robot 116*b*, and a post dip robot 116*c*. Preparation robot 116*a* may be positioned proximate to rotary milking platform 102 such that preparation robot 116*a* may extend and retract from beneath a dairy cow 106 in a milking stall 104 located at a first rotational position of rotary milking platform 102 (the "preparation position"). Preparation robot 116*a* may be operable to prepare the teats of a dairy cow 106 in the milking stall 104 located at the preparation position for the attachment of a milking apparatus 126 (e.g., by applying a first sanitizing agent to the teats of the dairy cow 106, cleaning the teats of the dairy cow 106, and stimulating the teats of the dairy cow 106).

Attachment robot 116*b* may positioned proximate to rotary milking platform 102 such that attachment robot 116*b* may extend and retract from beneath a dairy cow 106 located in a milking stall 104 located at a second rotational position of rotary milking platform 102 (the "attach position"). Attachment robot 116*b* may be operable to perform functions including attaching a milking apparatus 126 to the teats of a dairy cow 106 in the milking stall 104 located at the attach position. The milking apparatus 126 may be stored beneath the floor of the milking stall 104 (or at any other suitable location) such that the milking apparatus is accessible by attachment robot 116*b*.

Post dip robot 116*c* may be positioned proximate to rotary milking platform 102 such that post dip robot 116*c* may extend and retract from beneath a dairy cow 106 located in a milking stall 104 located at a third rotational position of rotary milking platform 102 (the "post dip position"). Post dip robot 116*c* may be operable to perform functions including applying a sanitizing agent to the teats of a dairy cow 106 in the milking stall 104 located at the post dip position. Each of the above-described functions performed by preparation robot 116*a*, attachment robot 116*b*, and post dip robot 116*c* may be performed while rotary milking platform 102 is substantially stationary (as controlled by controller 110 in conjunction with rotary drive mechanism 108, as described in further detail below).

In certain embodiments, various components of system 600 (e.g., rotary drive mechanism 108 and robotic devices 116) may each be communicatively coupled (e.g., via a network facilitating wireless or wireline communication) to controller 110, which may initiate/control the automated operation of those devices (as described in further detail below). In certain embodiments, controller 110 may include control logic 134 (e.g., stored memory module 130), which may include any information, logic, and/or instructions stored and/or executed by controller 110 to control the automated operation of system 600, as described below. For example, in response to control logic 134, processor 128 may (1) communicate signals to actuators coupled to gates (e.g., exit gate 136) to initiate opening/closing of those gates, (2) communicate signals to rotary drive mechanism 108 to initiate the starting/stopping of rotary milking platform 102, and (3) communicate signals to robotic devices 116 to initiate performance of the above-described functions associated with those robotic devices 116.

In operation of an example embodiment of system 600, controller 110 may receive a signal indicating that a dairy cow 106 has entered a milking stall 104 of rotary milking platform 102 (e.g., from a presence sensor or from any other suitable component of system 600). Additionally, controller 110 may receive a signal from identification device 120 and may include the identity (e.g., tag number) of the dairy cow 106. Once the identified dairy cow 106 has fully entered a milking stall 104, controller 110 may communicate signals to actuators coupled to entrance lane gate 142 and stall gate 117, the signals causing entrance lane gate 142 and stall gate 117 to close. Additionally, controller 110 may communicate a signal to rotary drive mechanism 108, the signal initiating an incremental rotation of rotary milking platform 102 such that the milking stall 104 in which the identified dairy cow 106 is located moves to a first rotational position of rotary milking platform 102 (the "preparation" position).

With the rotary milking platform 102 being substantially stationary and the milking stall 104 of the identified dairy cow 106 being located at the preparation position, preparation robot 116*a* (e.g., in response to a signal received from controller 110) may position itself beneath the identified dairy cow 106 and prepare the teats of the identified dairy cow 106 for the attachment of a milking apparatus 126 (e.g., by applying a sanitizing agent to the teats of the identified dairy cow 106, cleaning the teats of the identified dairy cow 106, and stimulating the teats of the identified dairy cow 106). Once preparation robot 116a has prepared the teats of the identified dairy cow 106 (and possibly after a next dairy cow 106 has fully entered a milking stall 104, as described above), controller 110 may communicate a signal to rotary drive mechanism 108, the signal initiating a further incremental rotation of rotary milking platform 102 (e.g., an amount corresponding to a single milking stall 104) such that the milking stall 104 of the identified dairy cow 106 moves from the first rotational position of rotary milking platform 102 (the "preparation" position) to a second rotational position of rotary milking platform 102 (the "attach" position).

With the rotary milking platform 102 being substantially stationary and the milking stall 104 of the identified dairy cow 106 being located at the attach position, attachment robot 116b (e.g., in response to a signal received from controller 110) may position itself beneath the identified dairy cow 106 and attach a milking apparatus 126 to the teats of the identified dairy cow 106. For example, attachment robot 116b may access a milking apparatus 126 corresponding to the milking stall 104 of the identified dairy cow 106 from a known storage position within the milking stall 104 (e.g., beneath the floor of the milking stall 104) and attach the accessed milking apparatus 126 to the teats of the identified dairy cow 106.

Once attachment robot 116b has attached the milking apparatus 126 to the teats of the identified dairy cow 106 (and possibly after preparation robot 116a has completed preparing the teats of a next dairy cow 106 for the attachment of a milking apparatus 126, as described above), controller 110 may communicate a signal to rotary drive mechanism 108, the signal initiating a further incremental rotation of rotary milking platform 102 (e.g., an amount corresponding to a single milking stall 104). As rotary milking platform 102 completes subsequent incremental rotations, the identified dairy cow 106 is milked, with the milking apparatus 126 being detached and withdrawn (e.g., by retracting the milking apparatus 126 to the known storage position within the milking stall 104) once milking is complete. With milking complete, the identified dairy cow 106 continues to complete incremental rotations until the milking stall 104 in which the identified dairy cow 106 is located reaches a third rotational position (the "post dip position").

With the rotary milking platform 102 being substantially stationary and the milking stall 104 of the identified dairy cow 106 being located at the post dip position, post dip robot 116c (e.g., in response to a signal received from controller 110) may position itself beneath the identified dairy cow 106 and apply a sanitizing agent to the teats of the identified dairy cow 106. In certain embodiments, the post dip position may be located proximate to an exit gate 136 leading to an exit pen 138. Once post dip robot 116c has applied the sanitizing agent, controller 110 may communicate a signal to an actuator coupled to exit gate 136, the signal initiating the opening of exit gate 136 such that the identified dairy cow 106 may exit the milking stall 104 and enter the exit pen 138. If, however, controller 110 determines either that the identified dairy cow 106 was not fully milked or that the milking apparatus 126 was detached prematurely (e.g., using historical milking data stored in milking log 132), a signal may not be communicated to the actuator coupled to exit gate 136, forcing the identified dairy cow 106 to complete another milking rotation (as described above).

Although a particular implementation of system 600 is illustrated and primarily described, the present disclosure contemplates any suitable implementation of system 600, according to particular needs. Moreover, although robotic devices 116 of system 600 have been primarily described as being located at particular positions relative to milking platform 102, the present disclosure contemplates robotic devices 116 being positioned at any suitable locations, according to particular needs.

FIG. 7 illustrates an example method 700 of installation of the automated rotary milking system 600 depicted in FIG. 6, according to certain embodiments of the present disclosure. The method begins at step 702. At step 704, first robotic device 116a (i.e., preparation robot 116a) is positioned at a first location proximate to rotary milking platform 102. The first location at which preparation robot 116a is positioned may correspond to the location of a milking stall 104 located at a first rotational position of rotary milking platform 102 (the "preparation position") such that preparation robot 116a may position itself beneath a dairy cow 106 located in preparation stall 112 in order to prepare the teats of the dairy cow 106 for the attachment of a milking apparatus 126.

At step 706, second robotic device 116b (i.e., attachment robot 116b) is positioned at a second location proximate to rotary milking platform 102. The second location at which attachment robot 116b is positioned may correspond to the location of a milking stall 104 located at a second rotational position of rotary milking platform 102 (the "attach position") such that attachment robot 116b may position itself beneath a dairy cow 106 in a milking stall 104 located at the attach position in order to attach a milking apparatus 126 to the teats of the dairy cow 106.

At step 708, third robotic device 116c (i.e., post dip robot 116c) is positioned at a third location proximate to rotary milking platform 102. The third location at which post dip robot 116c is positioned may correspond to the location of a milking stall 104 located at a third rotational position of rotary milking platform 102 (the "post dip position") such that post dip robot 116c may extend beneath a dairy cow 106 in a milking stall 104 located at the post dip position in order to apply a sanitizing agent to the teats of the dairy cow 106. The method ends at step 710.

Although the steps of method 700 have been described as being performed in a particular order, the present disclosure contemplates that the steps of method 700 may be performed in any suitable order, according to particular needs.

Figure 8:
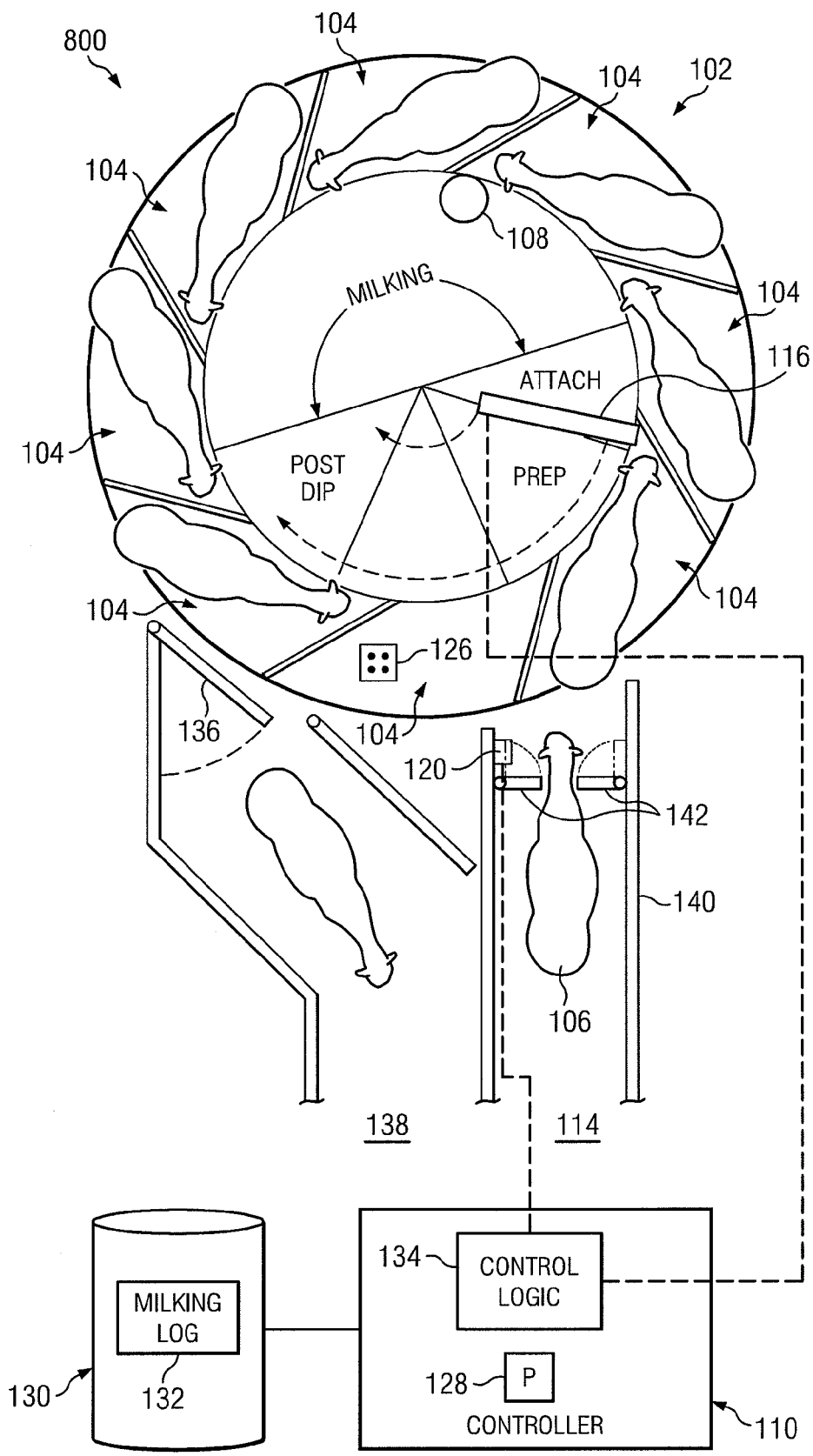
FIG. 8 illustrates a top view of an additional alternative example automated rotary milking parlor system, according to certain embodiments of the present disclosure.

FIG. 8 illustrates a top view of an additional alternative example automated rotary milking parlor system 800, according to certain embodiments of the present disclosure. System 800 includes a rotary milking platform 102 having a number of milking stalls 104, a rotary drive mechanism 108 coupled to the rotary milking platform, a single robotic device 116, and a controller 110 including control logic 134 (like-numbered components being substantially similar to those discussed above with regard to FIG. 1).

Additionally, rather than a preparation stall 112 positioned between holding pen 114 and milking stalls 104 of rotary milking platform 102, system 800 may include an entrance lane 140. Entrance lane 140 may include any suitable number of walls each constructed of any suitable materials arranged in any suitable configuration operable to encourage the orderly movement of dairy cows 106. For example, the walls of entrance lane 140 may each include any number and combination of posts, rails, tubing, rods, connectors, cables, wires, and/or beams operable to form a substantially planar barricade such as a fence, wall, and/or other appropriate structure suitable to encourage the orderly movement of dairy cows 106. By decreasing the effective area of holding pen 114 (e.g., using a crowd gate), the dairy cows 106 are encouraged to pass one at a time though entrance lane 140 and into milking stalls 104 of rotary milking platform 102. Entrance lane 140 may additionally include an entrance lane gate 142 for controlling the flow of dairy cows 104 into milking stalls 104 (to prevent dairy cows 106 from becoming injured by attempting to enter a milking stall 104 while rotary milking platform 102 is rotating).

The single robotic device 116 of system 800 may be positioned proximate to rotary milking platform 102 such that the single robotic device 116 may (1) extend and retract from beneath a dairy cow 106 in a milking stall 104 located at a first rotational position of rotary milking platform 102 (the "preparation position"), (2) extend and retract from beneath a dairy cow 106 located in a milking stall 104 located at a second rotational position of rotary milking platform 102 (the "attach position"), and (3) extend and retract from beneath a dairy cow 106 located in a milking stall 104 located at a third rotational position of rotary milking platform 102 (the "post dip position").

With regard to a dairy cow 106 in a stall 104 located at the preparation position, the single robotic device 116 may be operable to prepare the teats of a dairy cow 106 located in the milking stall 104 located at the preparation position for the attachment of a milking apparatus 126 (e.g., by applying a sanitizing agent to the teats of the dairy cow 106, cleaning the teats of the dairy cow 106, and stimulating the teats of a dairy cow 106).

With regard to a dairy cow 106 in a stall 104 located at the attach position, the single robotic device 116 may be operable to perform functions including attaching a milking apparatus 126 to the teats of a dairy cow 106 in the milking stall 104 located at the attach position. The milking apparatus 126 may be located beneath the floor of the milking stall 104 located at the first rotational position of rotary milking platform 102 (or at any other suitable location) such that the milking apparatus 126 is accessible by the single robotic device 116.

With regard to a dairy cow 106 in a stall 104 located at the post dip position, the single robotic device 116 may be operable to perform functions including applying a sanitizing agent to the teats of a dairy cow 106 in the milking stall 104 located at the post dip position. Each of the above-described functions performed by the single robotic device 116 may be performed while rotary milking platform 102 is substantially stationary (as controlled by controller 110 in conjunction with rotary drive mechanism 108, as described in further detail below).

In certain embodiments, various components of system 800 (e.g., rotary drive mechanism 108 and single robotic device 116) may each be communicatively coupled (e.g., via a network facilitating wireless or wireline communication) to controller 110, which may initiate/control the automated operation of those devices (as described in further detail below). In certain embodiments, controller 110 may include control logic 134 (e.g., stored memory module 130), which may include any information, logic, and/or instructions stored and/or executed by controller 110 to control the automated operation of system 800, as described below. For example, in response to control logic 134, processor 128 may (1) communicate signals to actuators coupled to gates (e.g., exit gate 136) to initiate opening/closing of those gates, (2) communicate signals to rotary drive mechanism 108 to initiate the starting/stopping of rotary milking platform 102, and (3) communicate signals to the single robotic device 116 to initiate performance of the above-described functions associated with single robotic device 116.

In operation of an example embodiment of system 800, controller 110 may receive a signal indicating that a dairy cow 106 has entered a milking stall 104 of rotary milking platform 102 (e.g., from a presence sensor or from any other suitable component of system 800). Additionally, controller 110 may receive a signal from identification device 120 and may include the identity (e.g., tag number) of the dairy cow 106. Once the identified dairy cow 106 has fully entered a milking stall 104, controller 110 may communicate a signal to an actuator coupled to entrance lane gate 142, the signal causing entrance lane gate 142 to close. Additionally, controller 110 may communicate a signal to rotary drive mechanism 108, the signal initiating an incremental rotation of rotary milking platform 102 such that the milking stall 104 in which the identified dairy cow 106 is located moves to a first rotational position of rotary milking platform 102 (the "preparation" position).

With the rotary milking platform 102 being substantially stationary and the milking stall 104 of the identified dairy cow 106 being located at the preparation position, the single robotic device 116 (e.g., in response to a signal received from controller 110) may position itself beneath the identified dairy cow 106 and prepare the teats of the dairy cow 106 for the attachment of a milking apparatus 126. In addition, the single robotic device 116 may (1) position itself beneath a dairy cow 106 in a milking stall 104 located at the attach position in order to attach a milking apparatus 126 to the teats of that dairy cow 106, and (2) position itself beneath a dairy cow 106 in a milking stall 104 located at the post dip position in order to apply a sanitizing agent to the teats of that dairy cow 106. Once the single robotic device 116 has performed each of these functions (and possibly after a next dairy cow 106 has fully entered a milking stall 104, as described above), controller 110 may communicate a signal to rotary drive mechanism 108, the signal initiating a further incremental rotation of rotary milking platform 102 (e.g., an amount corresponding to a single milking stall 104) such that the milking stall 104 of the identified dairy cow 106 moves from the first rotational position of rotary milking platform 102 (the "preparation" position) to a second rotational position of rotary milking platform 102 (the "attach" position).

With the rotary milking platform 102 being substantially stationary and the milking stall 104 of the identified dairy cow 106 being located at the attach position, the single robotic device 116 (e.g., in response to a signal received from controller 110) may position itself beneath the identified dairy cow 106 and attach a milking apparatus 126 to the teats of the identified dairy cow 106. For example, the single robotic device 116 may access a milking apparatus 126 corresponding to the milking stall 104 of the identified dairy cow 106 from a known storage position within the milking stall 104 (e.g., beneath the floor of the milking stall 104) and attach the accessed milking apparatus 126 to the teats of the identified dairy cow 106. In addition, the single robotic device 116 may (1) position itself beneath a dairy cow 106 in a milking stall 104 located at the preparation position in order to prepare the teats of that dairy cow 106 for the attachment of a milking apparatus 126, and (2) position itself beneath a dairy cow 106 in a milking stall 104 located at the post dip position in order to apply a sanitizing agent to the teats of that dairy cow 106. Once the single robotic device 116 has performed each of these functions (and possibly after a next dairy cow 106 has fully entered a milking stall 104, as described above), controller 110 may communicate a signal to rotary drive mechanism 108, the signal initiating a further incremental rotation of rotary milking platform 102 (e.g., an amount corresponding to a single milking stall 104).

As rotary milking platform 102 completes subsequent incremental rotations, the identified dairy cow 106 is milked, with the milking apparatus 126 being detached and withdrawn (e.g., by retracting the milking apparatus 126 to the known storage position within the milking stall 104) once milking is complete. With milking complete, the identified dairy cow 106 continues to complete incremental rotations until the milking stall 104 in which the identified dairy cow 106 is located reaches a third rotational position (the "post dip position"). With the rotary milking platform 102 being substantially stationary and the milking stall 104 of the identified dairy cow 106 being located at the post dip position, the single robotic device 116 (e.g., in response to a signal received from controller 110) may position itself beneath the identified dairy cow 106 and apply a sanitizing agent to the teats of the identified dairy cow 106. In addition, the single robotic device 116 may (1) position itself beneath a dairy cow 106 in a milking stall 104 located at the preparation position in order to prepare the teats of that dairy cow 106 for the attachment of a milking apparatus 126, and (2) position itself beneath a dairy cow 106 in a milking stall 104 located at the attach position in order to attach a milking apparatus 126 to the teats of that dairy cow 106.

In certain embodiments, the post dip position may be located adjacent to an exit gate 136 leading to an exit pen 138. Once single robotic 116 has applied the sanitizing agent, controller 110 may communicate a signal to an actuator coupled to exit gate 136, the signal initiating the opening of exit gate 136 such that the identified dairy cow may exit the milking stall 104 and enter the exit pen 138. If, however, controller 110 determines either that the identified cow was not fully milked or that the milking apparatus was detached prematurely (e.g., using historical milking data stored in milking log 132), a signal may not be communicated to the actuator coupled to exit gate 136, forcing the identified dairy cow 106 to complete another milking rotation (as described above).

Although a particular implementation of system 800 is illustrated and primarily described, the present disclosure contemplates any suitable implementation of system 800, according to particular needs. Moreover, although the single robotic devices 116 of system 800 has been primarily described as being located at a particular position relative to milking platform 102, the present disclosure contemplates the single robotic device 116 being positioned at any suitable location, according to particular needs.

Although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A milking system, comprising:
a rotary milking platform having a plurality of milking stalls;
a plurality of milking devices, each milking device configured for attachment to the teats of a dairy livestock located in a corresponding milking stall of the rotary milking platform;
a first robotic device operable to prepare the teats of a first dairy livestock while the first dairy livestock is located in a first milking stall of the rotary milking platform;
a second robotic device operable to attach a milking apparatus to the teats of a second dairy livestock while the second dairy livestock is located in a second milking stall of the rotary milking platform;
a third robotic device operable to apply a sanitizing agent to the teats of a third dairy livestock while the third dairy livestock is located in a third milking stall of the rotary milking platform; and
a controller that controls the operation of the second robotic device based at least in part upon a milking log that stores information regarding the amount of time that has elapsed since the last time the second dairy livestock was milked and whether an amount of milk collected from the second dairy livestock during a previous time period is less than a predefined threshold associated with the second dairy livestock.

2. The system of claim 1, wherein preparing the teats of a dairy livestock comprises:
applying a sanitizing agent to the teats of the dairy livestock;
cleaning the teats of the dairy livestock; and
stimulating the teats of the dairy livestock.

3. A method, comprising:
preparing the teats of a dairy livestock located in a milking stall of a rotary milking platform using a first robotic device;
attaching a milking apparatus to the teats of the dairy livestock using a second robotic device while the dairy livestock is located in the milking stall of the rotary milking platform;
applying a sanitizing agent to the teats of the dairy livestock using a third robotic device while the dairy livestock is located in the milking stall of the rotary milking platform; and
controlling the operation of at least one of the first robotic device, the second robotic device, and the third robotic device based at least in part upon a milking log that stores information regarding the amount of time that has elapsed since the last time the dairy livestock was milked and whether an amount of milk collected from the dairy livestock during a previous time period is less than a predefined threshold associated with the dairy livestock.

4. The method of claim 3, wherein preparing the teats of a dairy livestock comprises:
applying a sanitizing agent to the teats of the dairy livestock;
cleaning the teats of the dairy livestock; and
stimulating the teats of the dairy livestock.

5. A method, comprising:
positioning a first robotic device at a first location proximate to a rotary milking platform having a plurality of milking stalls, the first robotic device operable to prepare the teats of a first dairy livestock while the first dairy livestock is in a first milking stall of the rotary milking platform;
positioning a second robotic device at a second location proximate to the rotary milking platform, the second robotic device operable to attach a milking apparatus to the teats of a second dairy livestock while the second dairy livestock is located in a second milking stall of the rotary milking platform;
positioning a third robotic device at a third location proximate to the rotary milking platform, the third robotic device operable to apply a sanitizing agent to the teats of a third dairy livestock while the third dairy livestock is in a third milking stall of the rotary milking platform; and
controlling the operation of the second robotic device based at least in part upon a milking log that stores information regarding the amount of time that has elapsed since the last time the second dairy livestock was milked and whether an amount of milk collected from the second dairy livestock during a previous time period is less than a predefined threshold for the second dairy livestock.

6. The method of claim 5, wherein preparing the teats of the first dairy livestock comprises:
- applying a sanitizing agent to the teats of the first dairy livestock;
- cleaning the teats of the first dairy livestock; and
- stimulating the teats of the first dairy livestock.

7. A method, comprising:
- preparing, using a first robotic device, the teats of a first dairy livestock for the attachment of a milking apparatus while the first dairy livestock is located in a first milking stall of a rotary milking platform;
- attaching, using a second robotic device, a milking apparatus to the teats of a second dairy livestock while the second dairy livestock is located in a second milking stall of a rotary milking platform;
- applying, using a third robotic device, a sanitizing agent to the teats of a third dairy livestock while the third dairy livestock is located in a third milking stall of the rotary milking platform; and
- controlling the operation of the second robotic device based at least in part upon a milking log that stores information regarding the amount of time that has elapsed since the last time the second dairy livestock was milked and whether an amount of milk collected from the second dairy livestock during a previous time period is less than a predefined threshold for the second dairy livestock;

wherein:
- the first robotic device is positioned at a first location adjacent to the rotary milking platform;
- the second robotic device is positioned at a second location adjacent to the rotary milking platform;
- the third robotic device is positioned at a third location adjacent to the rotary milking platform.

8. The method of claim 7, wherein preparing the teats of the first dairy livestock comprises:
- applying a sanitizing agent to the teats of the first dairy livestock;
- cleaning the teats of the first dairy livestock; and
- stimulating the teats of the first dairy livestock.

* * * * *